United States Patent
Morishima et al.

(10) Patent No.: US 12,436,326 B2
(45) Date of Patent: Oct. 7, 2025

(54) OPTICALLY ANISOTROPIC FILM, CIRCULARLY POLARIZING PLATE, AND DISPLAY DEVICE

(71) Applicant: FUJIFILM Corporation, Tokyo (JP)

(72) Inventors: Shinichi Morishima, Kanagawa (JP); Yuki Hirai, Kanagawa (JP); Ryoji Himeno, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 527 days.

(21) Appl. No.: 17/949,701

(22) Filed: Sep. 21, 2022

(65) Prior Publication Data

US 2023/0012839 A1  Jan. 19, 2023
US 2023/0273361 A1  Aug. 31, 2023

Related U.S. Application Data

(63) Continuation of application No. PCT/JP2021/013607, filed on Mar. 30, 2021.

(30) Foreign Application Priority Data

Mar. 30, 2020 (JP) .................... 2020-059960

(51) Int. Cl.
*G02B 5/20* (2006.01)
*G02B 5/30* (2006.01)
*H10K 59/80* (2023.01)

(52) U.S. Cl.
CPC ............ *G02B 5/208* (2013.01); *G02B 5/305* (2013.01); *G02B 5/3091* (2013.01); *H10K 59/8791* (2023.02)

(58) Field of Classification Search
None
See application file for complete search history.

(56) References Cited

U.S. PATENT DOCUMENTS 6,673,398 B2 *  1/2004  Schneider .............. B82Y 30/00
                                                    349/193
2002/0168511 A1  11/2002  Schneider et al.
(Continued)

FOREIGN PATENT DOCUMENTS

JP  2012-500316 A  1/2012
JP  2012-507619 A  3/2012
(Continued)

OTHER PUBLICATIONS

International Search Report issued in PCT/JP2021/013607 on Jun. 8, 2021.
(Continued)

*Primary Examiner* — Ryan Crockett
(74) *Attorney, Agent, or Firm* — Edwards Neils LLC; Jean C. Edwards, Esq.

(57) ABSTRACT

An optically anisotropic film exhibiting reverse wavelength dispersibility and an Nz factor of about 0.50 (0.40 to 0.60) is formed of a lyotropic liquid crystalline composition containing non-colorable rod-like and plate-like compounds, where a measurement to obtain an ultraviolet-visible absorption spectrum by applying linearly polarized light is carried out by changing light direction and assuming that an absorbance at a maximum absorption wavelength in a wavelength range of 230 to 400 nm of the rod-like compound is highest at a first direction, and of the plate-like compound is highest at a second direction, the first direction and the second direction are orthogonal to each other, the maximum absorption wavelength in a wavelength range of 230 to 400 nm of the rod-like compound is smaller than that of the plate-like compound, and $Nz^P$ represented by Expression (N) $Nz^P = (nx^P - nz^P)/(nx^P - ny^P)$ of the plate-like compound is negative.

12 Claims, 3 Drawing Sheets

(56) References Cited

U.S. PATENT DOCUMENTS

| | | | |
|---|---|---|---|
| 2010/0085521 A1* | 4/2010 | Kasianova | C09K 19/60 252/299.61 |
| 2011/0272629 A1 | 11/2011 | Shin et al. | |
| 2012/0099052 A1 | 4/2012 | Lazarev | |
| 2020/0174171 A1* | 6/2020 | Nishikawa | C09K 19/3861 |
| 2021/0382348 A1* | 12/2021 | Nishikawa | H05B 33/02 |
| 2021/0389515 A1* | 12/2021 | Nishikawa | G02F 1/133541 |
| 2022/0113461 A1* | 4/2022 | Goto | G02B 5/3083 |
| 2022/0213044 A1* | 7/2022 | Goto | G02B 5/3083 |
| 2023/0042995 A1* | 2/2023 | Morishima | C09K 19/38 |
| 2023/0057804 A1* | 2/2023 | Morishima | G02B 5/208 |

FOREIGN PATENT DOCUMENTS

| | | |
|---|---|---|
| JP | 2013-543148 A | 11/2013 |
| JP | 2015-200754 A | 11/2015 |

OTHER PUBLICATIONS

Written Opinion issued in PCT/JP2021/013607 on Jun. 8, 2021.
International Preliminary Report on Patentability completed by WIPO on Sep. 29, 2022 in connection with International Patent Application No. PCT/JP2021/013607.
Office Action issued by the Japanese Patent Office on Jul. 11, 2023, in connection with Japanese Patent Application No. 2022-512564.
Office Action, issued by the State Intellectual Property Office of the People's Republic of China on Apr. 14, 2025, in connection with Chinese Patent Application No. 202180026566.X.

* cited by examiner

FIG. 2
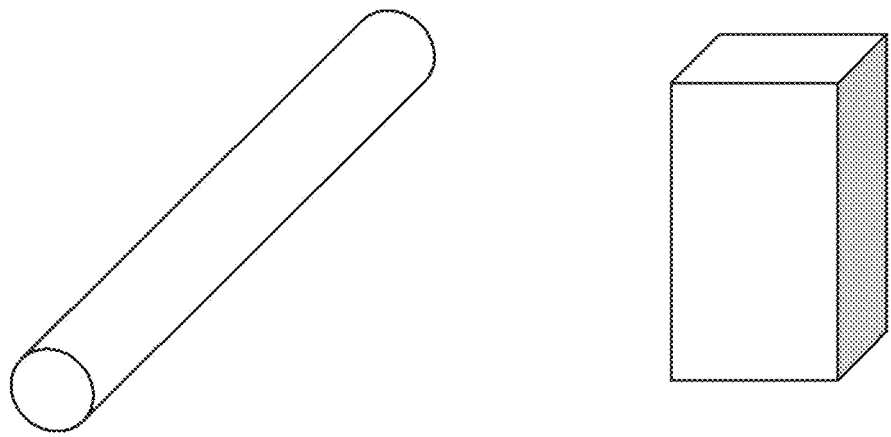
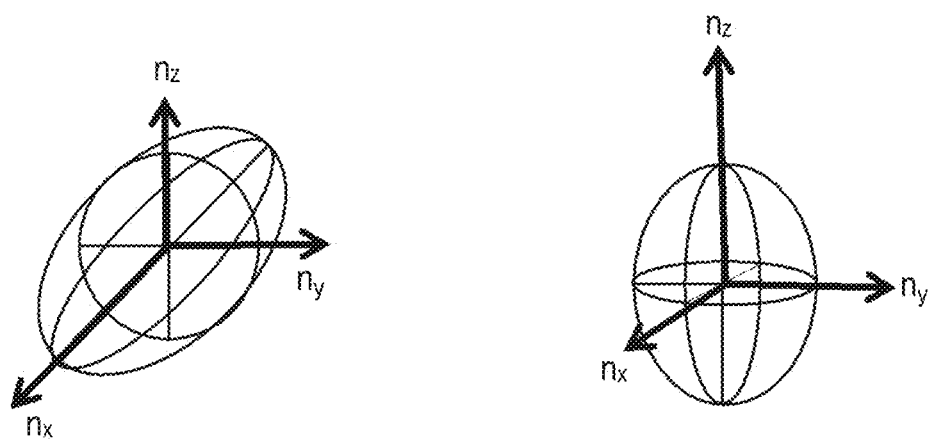
FIG. 3
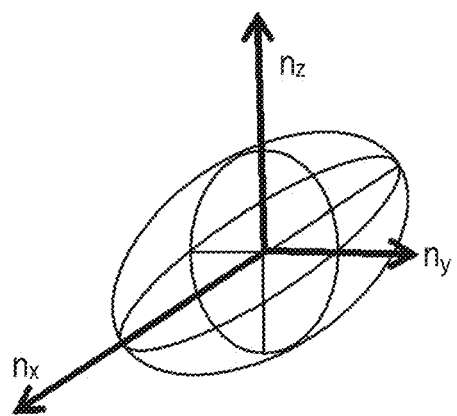

OPTICALLY ANISOTROPIC FILM, CIRCULARLY POLARIZING PLATE, AND DISPLAY DEVICE

CROSS-REFERENCE TO RELATED APPLICATIONS

This application is a Continuation of PCT International Application No. PCT/JP$_{2021/013607}$ filed on Mar. 30, 2021, which was published under PCT Article 21(2) in Japanese, and which claims priority under 35 U.S.C. § 119(a) to Japanese Patent Application No. 2020-059960 filed on Mar. 30, 2020. The above applications are hereby expressly incorporated by reference, in their entirety, into the present application.

BACKGROUND OF THE INVENTION

1. Field of the Invention

The present invention relates to an optically anisotropic film, a circularly polarizing plate, and a display device.

2. Description of the Related Art

A phase difference film having refractive index anisotropy (optically anisotropic film) is applied to various uses such as an antireflection film of a display device and an optical compensation film of a liquid crystal display device.

For example, JP2012-500316A proposes a biaxial optically anisotropic film formed of a composition exhibiting a lyotropic liquid crystallinity. Here, the term "biaxial" means that a refractive index nx in a slow axis direction, a refractive index ny in a fast axis direction, and a refractive index nz in a thickness direction of the optically anisotropic film satisfy a relationship of nx>nz>ny.

SUMMARY OF THE INVENTION

On the other hand, in recent years, an optically anisotropic film is required to exhibit reverse wavelength dispersibility.

In a case where the present inventors examined the characteristics of the biaxial optically anisotropic film described in JP2012-500316A, the film did not exhibit the reverse wavelength dispersibility, and further improvement was required.

The present invention has been made in view of the above circumstances, and an object of the present invention is to provide an optically anisotropic film exhibiting reverse wavelength dispersibility and an Nz factor of about 0.50 (0.40 to 0.60).

Another object of the present invention is to provide a circularly polarizing plate and a display device.

As a result of extensive studies on the problems of the related art, the present inventors have found that the foregoing objects can be achieved by the following configurations.

(1) An optically anisotropic film formed of a lyotropic liquid crystalline composition containing a non-colorable rod-like compound and a non-colorable plate-like compound, in which, in a case where a measurement to obtain an ultraviolet-visible absorption spectrum by applying linearly polarized light from a normal direction of the optically anisotropic film is carried out by changing a direction of the linearly polarized light and assuming that a direction in which an absorbance at a maximum absorption wavelength in a wavelength range of 230 to 400 nm of the rod-like compound is the highest is defined as a first direction, and a direction in which an absorbance at a maximum absorption wavelength in a wavelength range of 230 to 400 nm of the plate-like compound is the highest is defined as a second direction, the first direction and the second direction are orthogonal to each other, the maximum absorption wavelength in the wavelength range of 230 to 400 nm of the rod-like compound is smaller than the maximum absorption wavelength in the wavelength range of 230 to 400 nm of the plate-like compound, and $Nz^P$ represented by Expression (N), which will be described later, of the plate-like compound is negative.

$$Nz^P = (nx^P - nz^P)/(nx^P - ny^P) \qquad \text{Expression (N)}$$

(2) The optically anisotropic film according to (1), in which the $Nz^P$ is $-0.45$ to $-0.10$.

(3) The optically anisotropic film according to (1) or (2), in which the $Nz^P$ is $-0.30$ to $-0.15$.

(4) An optically anisotropic film formed of a lyotropic liquid crystalline composition containing a non-colorable rod-like compound and a non-colorable plate-like compound, in which, in a case where a measurement to obtain an ultraviolet-visible absorption spectrum by applying linearly polarized light from a normal direction of the optically anisotropic film is carried out by changing a direction of the linearly polarized light and assuming that a direction in which an absorbance at a maximum absorption wavelength in a wavelength range of 230 to 400 nm of the rod-like compound is the highest is defined as a first direction, and a direction in which an absorbance at a maximum absorption wavelength in a wavelength range of 230 to 400 nm of the plate-like compound is the highest is defined as a second direction, the first direction and the second direction arc orthogonal to each other, the maximum absorption wavelength in the wavelength range of 230 to 400 nm of the rod-like compound is smaller than the maximum absorption wavelength in the wavelength range of 230 to 400 nm of the plate-like compound, and $Nz^{P1}$ represented by Expression (N1), which will be described later, of the plate-like compound is negative.

$$Nz^{P1} = (nx^{P1} - nz^{P1})/((nx^{P1} - ny^{P1}) \qquad \text{Expression (N1)}$$

(5) The optically anisotropic film according to (4), in which the $Nz^{P1}$ is $-0.45$ to $-0.10$.

(6) The optically anisotropic film according to (4) or (5), in which the $Nz^{P1}$ is $-0.30$ to $-0.15$.

(7) The optically anisotropic film according to any one of (1) to (6), in which both the rod-like compound and the plate-like compound are lyotropic liquid crystal compounds.

(8) The optically anisotropic film according to any one of (1) to (7), in which the rod-like compound and the plate-like compound have a hydrophilic group.

(9) The optically anisotropic film according to any one of (1) to (8), in which the rod-like compound is a polymer having a repeating unit represented by Formula (X) which will be described later.

(10) The optically anisotropic film according to any one of (1) to (9), in which the plate-like compound is a compound represented by Formula (Y) which will be described later.

(11) A circularly polarizing plate having the optically anisotropic film according to any one of (1) to (10), and a polarizer.

(12) The circularly polarizing plate according to (11), in which an angle formed by an in-plane slow axis of the optically anisotropic film and an absorption axis of the polarizer is in a range of 45°±5°.

(13) A display device having the circularly polarizing plate according to (11) or (12), and a display element.

(14) The display device according to (13), in which the display element is an organic electroluminescence display element.

According to an aspect of the present invention, it is possible to provide an optically anisotropic film exhibiting reverse wavelength dispersibility and an Nz factor of about 0.50 (0.40 to 0.60).

According to another aspect of the present invention, it is possible to provide a circularly polarizing plate and a display device.

BRIEF DESCRIPTION OF THE DRAWINGS

FIG. 2 is a schematic diagram for explaining the optical properties of a non-colorable rod-like compound and a non-colorable plate-like compound.

FIG. 3 is a schematic diagram for explaining the optical properties of the optically anisotropic film of the present invention.

DESCRIPTION OF THE PREFERRED EMBODIMENTS

Figure 1:
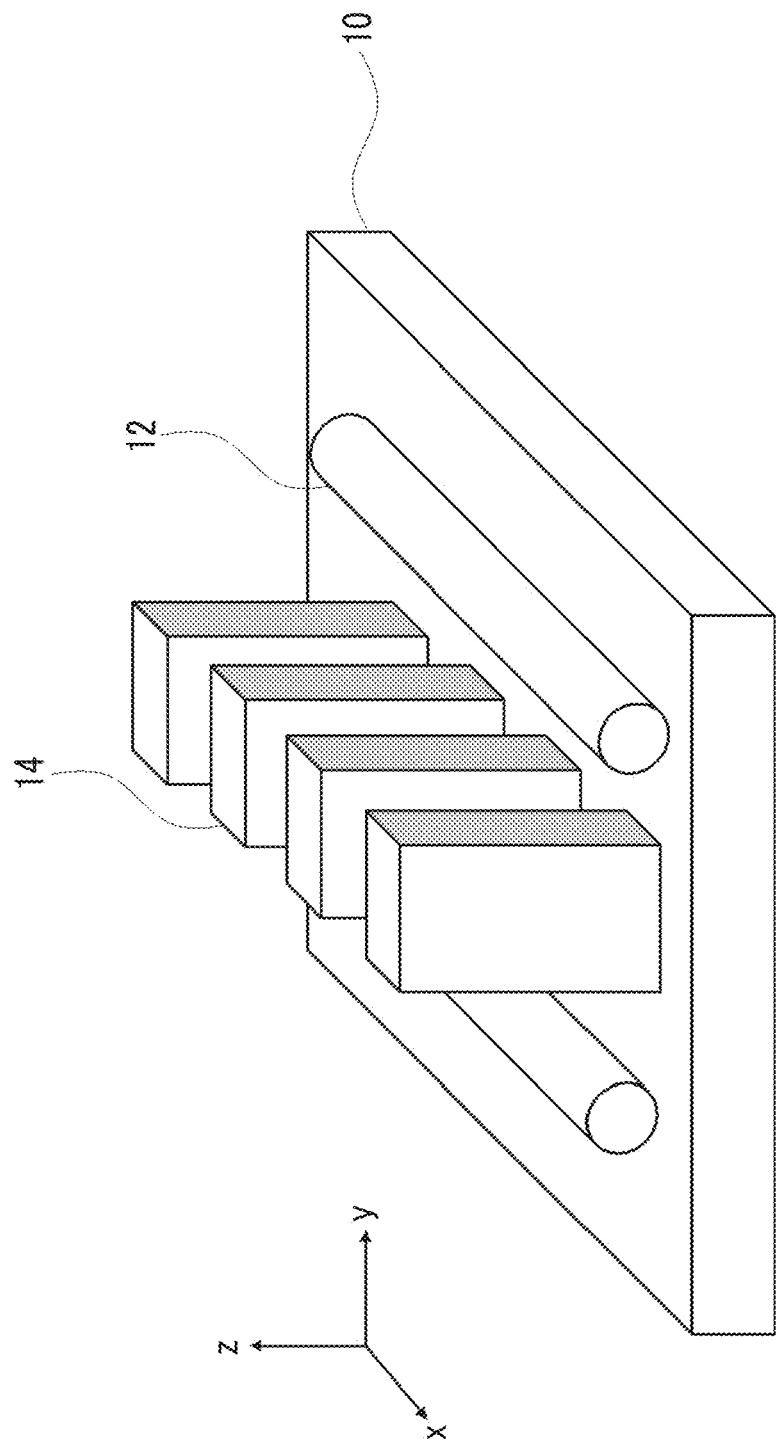
FIG. 1 is a schematic diagram for explaining a structure of an optically anisotropic film of the present invention.

Hereinafter, the present invention will be described in more detail.

Any numerical range expressed using "to" in the present specification refers to a range including the numerical values before and after the "to" as a lower limit value and an upper limit value, respectively.

In addition, the slow axis and the fast axis are defined at a wavelength of 550 nm unless otherwise specified. That is, unless otherwise specified, for example, the term "slow axis direction" means a direction of a slow axis at a wavelength of 550 nim.

In the present invention, $Re(\lambda)$ and $Rth(\lambda)$ represent an in-plane retardation at a wavelength $\lambda$ and a thickness direction retardation at a wavelength $\lambda$, respectively. Unless otherwise specified, the wavelength $\lambda$ is 550 nm.

In the present invention, $Re(\lambda)$ and $Rth(\lambda)$ are values measured at a wavelength $\lambda$ in AxoScan OPMF-1 (manufactured by Opto Science, Inc.). By inputting an average refractive index $((nx+ny+nz)/3)$ and a film thickness (d (μm)) in AxoScan, slow axis direction (°)

$Re(\lambda) = R0(\lambda)$ $Rth(\lambda) = ((nx-ny)/2-nz) \times d$ are calculated.

Although $R0(\lambda)$ is displayed as a numerical value calculated by AxoScan OPMF-1, it means $Re(\lambda)$.

In the present specification, the refractive indexes nx, ny, and nz are measured using an Abbe refractometer (NAR-4T, manufactured by Atago Co., Ltd.) and using a sodium lamp (I 589 nm) as a light source. In addition, in a case of measuring the wavelength dependence, it can be measured with a multi-wavelength Abbe refractometer DR-M2 (manufactured by Atago Co., Ltd.) in combination with an interference filter.

In addition, the values in Polymer Handbook (John Wiley & Sons, Inc.) and catalogs of various optical films can be used. The values of the average refractive index of main optical films arc illustrated below: cellulose acylate (1.48), cycloolefin polymer (1.52), polycarbonate (1.59), polymethylmethacrylate (1.49), and polystyrene (1.59).

In addition, in the present specification, the Nz factor is a value given by $Nz=(nx-nz)/(nx-ny)$.

nx in a case of calculating the Nz factor of the optically anisotropic film is a refractive index in an in-plane slow axis direction of the optically anisotropic film, ny in a case of calculating the Nz factor of the optically anisotropic film is a refractive index in an in-plane fast axis direction of the optically anisotropic film, and nz in a case of calculating the Nz factor of the optically anisotropic film is a refractive index in a thickness direction of the optically anisotropic film.

In addition, nx, ny, and nz in a case of calculating the Nz factor are each refractive index at a wavelength of 550 nm.

In the present specification, the "visible light" is intended to refer to light having a wavelength of 400 to 700 nm. In addition, the "ultraviolet ray" is intended to refer to light having a wavelength of 10 nm or longer and shorter than 400 nm.

In addition, in the present specification, the relationship between angles (for example, "orthogonal" or "parallel") is intended to include a range of errors acceptable in the art to which the present invention pertains. For example, it means that an angle is in an error range of ±5° with respect to the exact angle, and the error with respect to the exact angle is preferably in a range of ±3°.

The bonding direction of the divalent group (for example, —COO—) described in the present specification is not particularly limited. For example, in a case where L in X-L-Y is —COO— and then in a case where the position bonded to the X side is defined as *1 and the position bonded to the Y side is defined as *2, L may be *1-O—CO-*2 or *1-CO—O-*2.

In the optically anisotropic film according to the embodiment of the present invention, a rod-like compound and a plate-like compound, each of which will be described later, are disposed so as to exhibit predetermined optical properties.

The composition used for forming the optically anisotropic film is a composition exhibiting lyotropic liquid crystallinity, and in a case of forming the optically anisotropic film, an alignment state is formed along a predetermined shear direction. Specifically, as shown in FIG. 1, in a case where the composition is applied onto a support 10 and shear is applied along an x-axis direction, the rod-like compound 12 that functions as a host is disposed on the support 10 such that its molecular axis (direction in which the rod-like compound 12 extends) is along the x-axis direction. In addition, the plate-like compound 14 has a ring structure inside thereof, and has a plate-like structure as a whole. Therefore, as shown in FIG. 1, a plurality of plate-like compounds 14 are disposed such that the surfaces of the plate-like structures face each other (in other words, the ring structures inside the compound face each other). Then, a column-like associate formed by associating the plate-like compounds 14 with each other is disposed such that an extending direction of the associate is along the molecular axis of the rod-like compound 12 that is a host. At that time, as shown in FIG. 1, the plate-like compound 14 is disposed such that the plate-like compound 14 stands against the support 10. That is, the plate-like compound 14 is disposed such that a major axis direction of the plate-like compound 14 is along the normal direction (z-axis direction) of the support 10.

As will be described later, in the plane of the optically anisotropic film, upon assuming that the direction in which the absorbance at a maximum absorption wavelength in a wavelength range of 230 to 400 nm of the rod-like compound is the highest is defined as the first direction, and the direction in which the absorbance at a maximum absorption wavelength in a wavelength range of 230 to 400 nm of the plate-like compound is the highest is defined as the second direction, the first direction and the second direction are orthogonal to each other. This optical property shows the arrangement of the rod-like compound 12 and the plate-like compound 14, as shown in FIG. 1. More specifically, in the plane of the optically anisotropic film, the direction in which the rod-like compound 12 has the highest absorbance is the x-axis direction, and the direction in which the plate-like compound 14 has the highest absorbance is the y-axis direction, as shown in FIG. 1. Therefore, the above optical properties are derived from the arrangement relationship of the rod-like compound 12 and the plate-like compound 14, as shown in FIG. 1.

In addition, the Nz factor of an optically anisotropic film P which will be described later is negative. This optical property is achieved by disposing the rod-like compound 12 so as to stand up, as shown in FIG. 1.

Therefore, the above optical properties are derived from the arrangement relationship of the rod-like compound 12 and the plate-like compound 14, as shown in FIG. 1.

As shown in FIG. 1, in a case where the rod-like compound 12 is disposed with its molecular axis along the x-axis direction, a refractive index nx in the x-axis direction, a refractive index ny in the y-axis direction, and a refractive index nz in the z-axis direction of the rod-like compound 12 are represented as shown in FIG. 2, and nx is the largest. In addition, as shown in FIG. 1, in a case where the plate-like compound 14 is disposed, a refractive index nx in the x-axis direction, a refractive index ny in the y-axis direction, and a refractive index nz in the z-axis direction of the plate-like compound 14 are represented as shown in FIG. 2, and nz is the largest. The refractive index nx in the x-axis direction, the refractive index ny in the y-axis direction, and the refractive index nz in the z-axis direction of the optically anisotropic film depend on the refractive index nx in the x-axis direction, the refractive index ny in the y-axis direction, and the refractive index nz in the z-axis direction of each component contained in the optically anisotropic film. Therefore, in a case where the rod-like compound 12 and the plate-like compound 14 are disposed as shown in FIG. 1, the refractive index nx in the x-axis direction, the refractive index ny in the y-axis direction, and the refractive index nz in the z-axis direction of the optically anisotropic film are as shown in FIG. 3, the x-axis direction in FIG. 1 is the slow axis, and the refractive index nx, the refractive index ny, and the refractive index nz of the optically anisotropic film satisfy the relationship of nx>nz>ny. That is, it becomes easy to satisfy a predetermined requirement (0.40 to 0.60) of the Nz factor.

Figure 4:
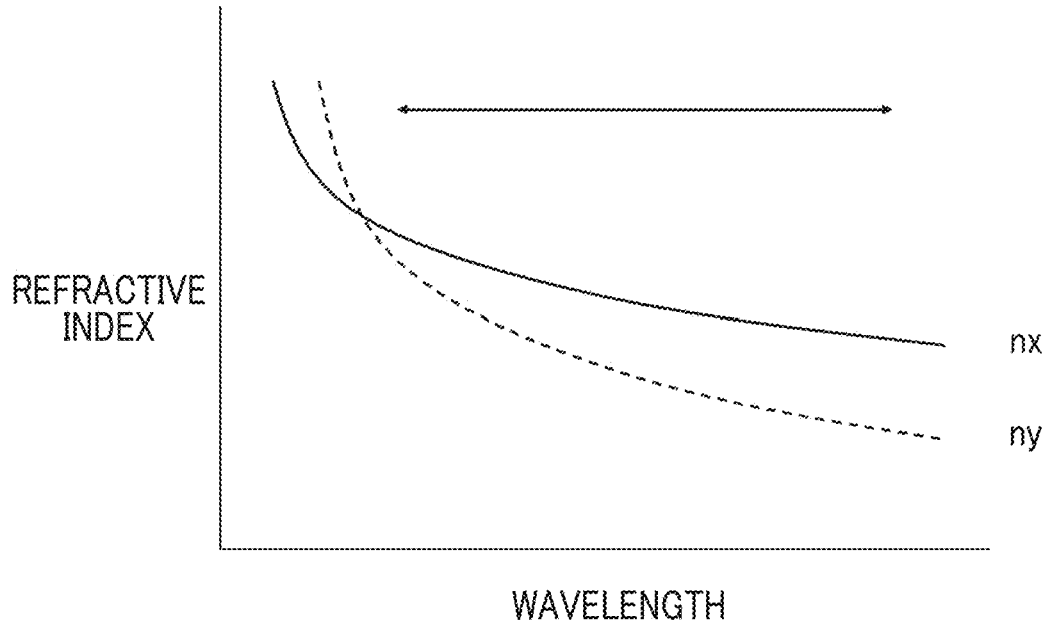
FIG. 4 is a diagram showing a comparison of wavelength dispersion between an extraordinary ray refractive index ne and an ordinary ray refractive index no of the optically anisotropic film of the present invention exhibiting reverse wavelength dispersibility.

Further, in the present invention, the maximum absorption wavelength in a wavelength range of 230 to 400 nm of the rod-like compound is smaller than the maximum absorption wavelength in a wavelength range of 230 to 400 nm of the plate-like compound. That is, the rod-like compound has a maximum absorption wavelength on the shorter wavelength side, and the plate-like compound has a maximum absorption wavelength on the longer wavelength side. As shown in FIG. 1, the molecular axis of the rod-like compound 12 is arranged along the x-axis direction, and the molecular axis of the plate-like compound 14 is arranged along the y-axis direction. Therefore, as shown in FIG. 4, the refractive index nx decreases earlier than the refractive index ny, and the refractive index nx decreases more slowly than the refractive index ny in the region indicated by the arrow, so that the reverse wavelength dispersibility is achieved.

For the sake of simplicity, only two rod-like compounds 12 and four plate-like compounds 14 are shown in FIG. 1, but the number of rod-like compounds and plate-like compounds in the optically anisotropic film is not limited to the aspect shown in FIG. 1.

The optically anisotropic film according to the embodiment of the present invention (hereinafter, also simply referred to as "optically anisotropic film") is an optically anisotropic film formed of a lyotropic liquid crystalline composition containing a non-colorable rod-like compound and a non-colorable plate-like compound (hereinafter, also simply referred to as "composition").

In the following, first, the materials contained in the composition will be described in detail, and then the optically anisotropic film formed of the composition will be described in detail.

(Rod-Like Compound)

The composition contains a non-colorable rod-like compound (hereinafter, also simply referred to as "rod-like compound"). As described above, the rod-like compound tends to be aligned in a predetermined direction.

The term "non-colorable" means showing no absorption in a visible light range. More specifically, it means that the absorbance in a visible light range (wavelength of 400 to 700 nm) is 0.1 or less in a case of measuring the ultraviolet-visible absorption spectrum of a solution in which a rod-like compound is dissolved at a concentration such that the absorbance at the maximum absorption wavelength in an ultraviolet light range (wavelength of 230 to 400 nm) is 1.0.

The rod-like compound preferably exhibits lyotropic liquid crystallinity. That is, the rod-like compound is preferably a non-colorable lyotropic liquid crystal rod-like compound. The lyotropic liquid crystallinity refers to a property of causing a phase transition between an isotropic phase and a liquid crystal phase by changing a temperature or a concentration in a solution state dissolved in a solvent.

The rod-like compound is preferably water-soluble from the viewpoint that it is easy to control the expression of liquid crystallinity. The water-soluble rod-like compound represents a rod-like compound that dissolves in 1% by mass or more in water, and is preferably a rod-like compound that dissolves in 5% by mass or more in water.

The rod-like compound refers to a compound having a structure in which a ring structure (an aromatic ring, a non-aromatic ring, or the like) is one-dimensionally connected through a single bond or a divalent linking group, and refers to a group of compounds having a property of being aligned such that major axes thereof are aligned in parallel with each other in a solvent.

The rod-like compound preferably has a maximum absorption wavelength in a wavelength range of 300 nm or shorter. That is, the rod-like compound preferably has a maximum absorption peak in a wavelength range of 300 nm or shorter.

The maximum absorption wavelength of the rod-like compound means a wavelength at which the absorbance takes a maximal value in the absorption spectrum of the rod-like compound (measurement range: wavelength range of 230 to 400 nm). In a case where there are a plurality of maximal values in the absorbance of the absorption spectrum of the rod-like compound, the wavelength on the longest wavelength side in the measurement range is selected.

Above all, from the viewpoint that the effect of the present invention is excellent, the rod-like compound preferably has a maximum absorption wavelength in a range of 230 to 300 nm, and more preferably has a maximum absorption wavelength in a range of 250 to 290 nm.

The method for measuring the maximum absorption wavelength is as follows.

The rod-like compound (5 to 50 mg) is dissolved in pure water (1000 ml), and the absorption spectrum of the obtained solution is measured using a spectrophotometer (MPC-3100, manufactured by Shimadzu Corporation).

In the present invention, the maximum absorption wavelength in a wavelength range of 230 to 400 nm of the rod-like compound is smaller than the maximum absorption wavelength in a wavelength range of 230 to 400 nm of the plate-like compound which will be described later.

The difference between the maximum absorption wavelength of the rod-like compound and the maximum absorption wavelength of the plate-like compound is not particularly limited, and is preferably 50 nm or more and more preferably 70 nm or more.

As described above, the maximum absorption wavelength of the rod-like compound means a wavelength at which the absorbance takes a maximal value in the absorption spectrum of the rod-like compound (measurement range: wavelength range of 230 to 400 nm). In a case where there are a plurality of maximal values in the absorbance of the absorption spectrum of the rod-like compound, the wavelength on the longest wavelength side in the measurement range is selected.

In addition, as will be described later, the maximum absorption wavelength of the plate-like compound means a wavelength at which the absorbance takes a maximal value in the absorption spectrum of the plate-like compound (measurement range: wavelength range of 230 to 400 nm). In a case where there are a plurality of maximal values in the absorbance of the absorption spectrum of the plate-like compound, the wavelength on the longest wavelength side in the measurement range is selected.

The wavelength dispersibility $D^R$ represented by Expression (R) of the rod-like compound is preferably 1.05 or more and less than 1.20 from the viewpoint that the effect of the present invention is more excellent. The wavelength dispersibility $D^R$ is an optical property of the optically anisotropic film of the rod-like compound as will be described later, and this optical property corresponds to the optical property exhibited by the rod-like compound in the optically anisotropic film.

$$\text{Wavelength dispersibility } D^R = Re(450)^R / Re(550)^R \quad \text{Expression (R)}$$

$Re(450)^R$ represents an in-plane retardation of an optically anisotropic film R, which is formed by using a mixed solution R obtained by mixing 10 parts by mass of a rod-like compound and 90 parts by mass of water, at a wavelength of 450 nm. $Re(550)^R$ represents the in-plane retardation of the optically anisotropic film R at a wavelength of 550 nm.

As described above, the wavelength dispersibility $D^R$ represented by Expression (R) of the rod-like compound represents the relationship of the in-plane retardation of the optically anisotropic film R formed by using the rod-like compound.

As a method for preparing the optically anisotropic film R, the mixed solution R is applied onto a glass substrate with a #4 wire bar (moving speed: 100 cm/s) and then naturally dried at room temperature (20° C.) to prepare the optically anisotropic film R (film thickness: about 240 nm).

The type of the rod-like compound contained in the mixed solution R is the same as that of the rod-like compound in the composition.

It is preferable that the wavelength dispersibility $D^R$ and the wavelength dispersibility $D^P$ which will be described later have different values.

The Nz factor ($Nz^R$) of the optically anisotropic film R is usually 1.

The Nz factor of the optically anisotropic film R is a value given by $Nz^R = (nx^R - nz^R)/(nx^R - ny^R)$.

$nx^R$ is a refractive index in an in-plane slow axis direction of the optically anisotropic film R, $ny^R$ is a refractive index in an in-plane fast axis direction of the optically anisotropic film R, and $nz^R$ is a refractive index in a thickness direction of the optically anisotropic film R. $nx^R$, $ny^R$, and $nz^R$ are the respective refractive indexes at a wavelength of 550 nm.

The rod-like compound preferably has a hydrophilic group from the viewpoint that the effect of the present invention is more excellent.

The rod-like compound may have only one hydrophilic group or may have a plurality of hydrophilic groups.

Examples of the hydrophilic group include an acid group or a salt thereof, an onium base, a hydroxy group, a sulfonamide group ($H_2N-SO_2-$), and a polyoxyalkylene group. Of these, an acid group or a salt thereof is preferable.

The acid group or the salt thereof will be described in detail later.

The onium base is a group derived from an onium salt, and examples thereof include an ammonium base ($*-N^+(R^Z)_4A^-$), a phosphonium base ($*-P^+(R^Z)_4A^-$), and a sulfonium base ($*-S^+(R^Z)_2A^-$). $R^Z$'s each independently represent a hydrogen atom, an alkyl group, an aryl group, or a heteroaryl group. $A^-$ represents an anion (for example, a halogen ion). * represents a bonding position.

Examples of the polyoxyalkylene group include a group represented by $R^Z-(O-L^Z)_n-*$. $R^Z$ is as described above. $L^Z$ represents an alkylene group. * represents a bonding position.

Examples of the acid group or the salt thereof include a sulfo group ($-SO_3H$) or a salt thereof ($-SO_3^-M^+$ where $M^+$ represents a cation) and a carboxyl group ($-COOH$) or a salt thereof ($-COO^-M^+$ where $M^+$ represents a cation), among which a sulfo group or a salt thereof is preferable from the viewpoint that the effect of the present invention is more excellent.

The salt is one in which a hydrogen ion of an acid is substituted with another cation of a metal or the like. That is, the salt of an acid group means one in which a hydrogen ion of an acid group such as a $-SO_3H$ group is substituted with another cation.

Examples of cations in the salt of an acid group (for example, cations in the salt of a sulfo group and the salt of a carboxyl group) include $Na^+$, $K^+$, $Li^+$, $Rb^+$, $Cs^+$, $Ba^{2+}$, $Ca^{2+}$, $Mg^{2+}$, $Sr^{2+}$, $Pb^{2+}$, $Zn^{2+}$, $La^{3+}$, $Ce^{3+}$, $Y^{3+}$, $Yb^{3+}$, $Gd^{3+}$, and $Zr^{4+}$. Above all, an alkali metal ion is preferable, $Na^+$ or $Li^+$ is more preferable, and $Li^+$ is still more preferable, from the viewpoint that the effect of the present invention is more excellent.

The rod-like compound is preferably a polymer having a repeating unit represented by Formula (X), from the viewpoint that the effect of the present invention is more excellent.

  (X)

$R^{x1}$ represents a divalent aromatic ring group having a substituent containing a hydrophilic group, a divalent non-aromatic ring group having a substituent containing a hydrophilic group, or a group represented by Formula (X1). In Formula (X1), * represents a bonding position.

  Formula (X1)

$R^{x3}$ and $R^{x4}$ each independently represent a divalent aromatic ring group which may have a substituent containing a hydrophilic group, or a divalent non-aromatic ring group which may have a substituent containing a hydrophilic group, and at least one of $R^{x3}$ or $R^{x4}$ represents a divalent aromatic ring group which has a substituent containing a hydrophilic group, or a divalent non-aromatic ring group which has a substituent containing a hydrophilic group.

$L^{x3}$ represents a single bond, —O—, —S—, an alkylene group, an alkenylene group, or an alkynylene group.

The divalent aromatic ring group and the divalent non-aromatic ring group represented by $R^{x1}$ have a substituent containing a hydrophilic group.

Examples of the hydrophilic group contained in the substituent containing a hydrophilic group include the above-mentioned groups, among which an acid group or a salt thereof is preferable.

The substituent containing a hydrophilic group is preferably a group represented by Formula (H). In Formula (H), * represents a bonding position.

  Formula (H)

$R^{H}$ represents a hydrophilic group. The definition of the hydrophilic group is as described above.

$L^{H}$ represents a single bond or a divalent linking group. The divalent linking group is not particularly limited, and examples thereof include a divalent hydrocarbon group (for example, a divalent aliphatic hydrocarbon group such as an alkylene group having 1 to 10 carbon atoms, an alkenylene group having 1 to 10 carbon atoms, or an alkynylene group having 1 to 10 carbon atoms; or a divalent aromatic hydrocarbon group such as an arylene group), a divalent heterocyclic group, —O—, —S—, —NH—, —CO—, and a group formed by a combination thereof (for example, —CO—O—, —O-divalent hydrocarbon group-, —(O-divalent hydrocarbon group)$_m$-O— where m represents an integer of 1 or more), or -divalent hydrocarbon group-O—CO—).

The number of substituents containing a hydrophilic group in the divalent aromatic ring group is not particularly limited, and is preferably 1 to 3 and more preferably 1 from the viewpoint that the effect of the present invention is more excellent.

The number of substituents containing a hydrophilic group in the divalent non-aromatic ring group is not particularly limited, and is preferably 1 to 3 and more preferably 1 from the viewpoint that the effect of the present invention is more excellent.

The aromatic ring constituting the divalent aromatic ring group having a substituent containing a hydrophilic group represented by $R^{x1}$ may have a monocyclic structure or a polycyclic structure.

Examples of the aromatic ring constituting the divalent aromatic ring group include an aromatic hydrocarbon ring and an aromatic heterocyclic ring. That is, examples of $R^{x1}$ include a divalent aromatic hydrocarbon ring group having a substituent containing a hydrophilic group and a divalent aromatic heterocyclic group having a substituent containing a hydrophilic group.

Examples of the aromatic hydrocarbon ring include a benzene ring and a naphthalene ring.

Examples of the structure of only the divalent aromatic hydrocarbon ring group portion of the divalent aromatic hydrocarbon ring group having a substituent containing a hydrophilic group include the following group. * represents a bonding position.

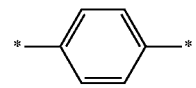

Examples of the aromatic heterocyclic ring include a pyridine ring, a thiophene ring, a pyrimidine ring, a thiazole ring, a furan ring, a pyrrole ring, an imidazole ring, and an indole ring.

Examples of the structure of only the divalent aromatic heterocyclic group portion of the divalent aromatic heterocyclic group having a substituent containing a hydrophilic group include the following groups. * represents a bonding position.

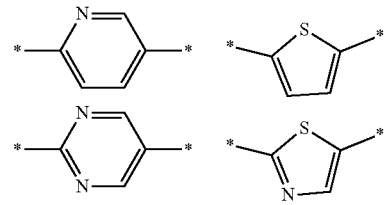

The non-aromatic ring constituting the divalent non-aromatic ring group having a substituent containing a hydrophilic group represented by $R^{x1}$ may have a monocyclic structure or a polycyclic structure.

Examples of the non-aromatic ring constituting the divalent non-aromatic ring group include an aliphatic ring and a non-aromatic heterocyclic ring, among which an aliphatic ring is preferable, cycloalkane is more preferable, and cyclohexane is still more preferable, from the viewpoint that the effect of the present invention is more excellent. That is, examples of $R^{x1}$ include a divalent aliphatic ring group having a substituent containing a hydrophilic group and a divalent non-aromatic heterocyclic group having a substituent containing a hydrophilic group, among which a divalent cycloalkylene group having a substituent containing a hydrophilic group is preferable.

The aliphatic ring may be a saturated aliphatic ring or an unsaturated aliphatic ring.

Examples of the structure of only the divalent aliphatic ring group portion of the divalent aliphatic ring group having a substituent containing a hydrophilic group include the following groups. * represents a bonding position.

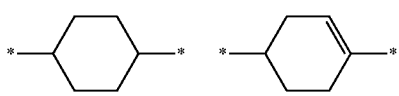

The heteroatom contained in the non-aromatic heterocyclic ring is not particularly limited, and examples thereof include an oxygen atom, a nitrogen atom, and a sulfur atom.

The number of heteroatoms contained in the non-aromatic heterocyclic ring is not particularly limited, and examples thereof include 1 to 3.

Examples of the structure of only the divalent non-aromatic heterocyclic group portion of the divalent non-aromatic heterocyclic group having a substituent containing a hydrophilic group include the following group. * represents a bonding position.

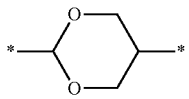

The divalent aromatic ring group having a substituent containing a hydrophilic group and the divalent non-aromatic ring group having a substituent containing a hydrophilic group represented by $R^{x1}$ may have a substituent other than the substituent containing a hydrophilic group.

The substituent is not particularly limited, and examples thereof include an alkyl group, an alkenyl group, an alkynyl group, an aryl group, an amino group, an alkoxy group, an aryloxy group, an aromatic heterocyclic oxy group, an acyl group, an alkoxycarbonyl group, an aryloxycarbonyl group, an acyloxy group, an acylamino group, an alkoxycarbonylamino group, an aryloxycarbonylamino group, an alkylthio group, an arylthio group, an aromatic heterocyclic thio group, a ureido group, a halogen atom, a cyano group, a hydrazino group, a heterocyclic group (for example, a heteroaryl group), a silyl group, and a group formed by a combination thereof. The above-mentioned substituent may be further substituted with a substituent.

$R^{x3}$ and $R^{x4}$ each independently represent a divalent aromatic ring group which may have a substituent containing a hydrophilic group, or a divalent non-aromatic ring group which may have a substituent containing a hydrophilic group, and at least one of $R^{x3}$ or $R^{x4}$ represents a divalent aromatic ring group which has a substituent containing a hydrophilic group, or a divalent non-aromatic ring group which has a substituent containing a hydrophilic group.

The definition of the substituent containing a hydrophilic group which the divalent aromatic ring group represented by $R^{x3}$ and $R^{x4}$ may have is as described above.

In addition, the definition of the aromatic ring constituting the divalent aromatic ring group which may have a substituent containing a hydrophilic group, which is represented by $R^{x3}$ and $R^{x4}$, is the same as the above-mentioned definition of the aromatic ring constituting the divalent aromatic ring group having a substituent containing a hydrophilic group represented by $R^{x1}$.

The definition of the substituent containing a hydrophilic group which the divalent non-aromatic ring group represented by $R^{x3}$ and $R^{x4}$ may have is as described above.

In addition, the definition of the non-aromatic ring constituting the divalent non-aromatic ring group which may have a substituent containing a hydrophilic group, which is represented by $R^{x3}$ and $R^{x4}$, is the same as the above-mentioned definition of the non-aromatic ring constituting the divalent non-aromatic ring group having a substituent containing a hydrophilic group represented by $R^{x1}$.

At least one of $R^{x3}$ or $R^{x4}$ represents a divalent aromatic ring group having a substituent containing a hydrophilic group or a divalent non-aromatic ring group having a substituent containing a hydrophilic group, and both $R^{x3}$ and $R^{x4}$ may represent a divalent aromatic ring group having a substituent containing a hydrophilic group or a divalent non-aromatic ring group having a substituent containing a hydrophilic group.

The definition of the divalent aromatic ring group having a substituent containing a hydrophilic group represented by $R^{x3}$ and $R^{x4}$ is the same as the above-mentioned definition of the divalent aromatic ring group having a substituent containing a hydrophilic group represented by $R^{x1}$.

In addition, the definition of the divalent non-aromatic ring group having a substituent containing a hydrophilic group represented by $R^{x3}$ and $R^{x4}$ is the same as the above-mentioned definition of the divalent non-aromatic ring group having a substituent containing a hydrophilic group represented by $R^{x1}$.

$L^{x3}$ represents a single bond, —O—, —S—, an alkylene group, an alkenylene group, or an alkynylene group.

The number of carbon atoms in the alkylene group is not particularly limited, and is preferably 1 to 3 and more preferably 1 from the viewpoint that the effect of the present invention is more excellent.

The number of carbon atoms in the alkenylene group and the alkynylene group is not particularly limited, and is preferably 2 to 5 and more preferably 2 to 4 from the viewpoint that the effect of the present invention is more excellent.

$R^{x2}$ represents a divalent non-aromatic ring group or a group represented by Formula (X2). In Formula (X2), * represents a bonding position.

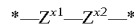            Formula (X2)

$Z^{x1}$ and $Z^{x2}$ each independently represent a divalent non-aromatic ring group. * represents a bonding position.

The non-aromatic ring constituting the divalent non-aromatic ring group represented by $R^{x2}$ may have a monocyclic structure or a polycyclic structure.

Examples of the non-aromatic ring constituting the divalent non-aromatic ring group include an aliphatic ring and a non-aromatic heterocyclic ring, among which an aliphatic ring is preferable, cycloalkane is more preferable, and cyclohexane is still more preferable, from the viewpoint that the effect of the present invention is more excellent. That is, examples of $R^{x2}$ include a divalent aliphatic ring group and a divalent non-aromatic heterocyclic group, among which a divalent cycloalkylene group is preferable.

The aliphatic ring may be a saturated aliphatic ring or an unsaturated aliphatic ring.

Examples of the divalent aliphatic ring group include the following groups. * represents a bonding position.

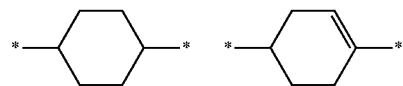

The heteroatom contained in the non-aromatic heterocyclic ring is not particularly limited, and examples thereof include an oxygen atom, a nitrogen atom, and a sulfur atom.

The number of heteroatoms contained in the non-aromatic heterocyclic ring is not particularly limited, and examples thereof include 1 to 3.

Examples of the divalent non-aromatic heterocyclic group include the following group. * represents a bonding position.

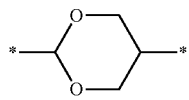 [SMILES: *C1COC(*)OC1]

The divalent non-aromatic ring group may have a substituent. The type of the substituent is not particularly limited, and examples thereof include groups exemplified by substituents other than the substituent containing a hydrophilic group that the divalent aromatic ring group having a substituent containing a hydrophilic group and the divalent non-aromatic ring group having a substituent containing a hydrophilic group represented by $R^{x1}$ may have.

$Z^{x1}$ and $Z^{x2}$ each independently represent a divalent non-aromatic ring group.

The definition of the divalent non-aromatic ring group represented by $Z^{x1}$ and $Z^{x2}$ is the same as the above-mentioned definition of the divalent non-aromatic ring group represented by $R^{x2}$.

$L^{x1}$ and $L^{x2}$ each independently represent —CONH—, —COO—, —O—, or —S—. Above all, —CONH— is preferable from the viewpoint that the effect of the present invention is more excellent.

The repeating unit represented by Formula (X) is preferably a repeating unit represented by Formula (X4).

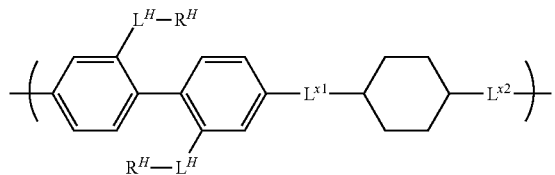

(X4)

The definition of each group in Formula (X4) is as described above.

The content of the repeating unit represented by Formula (X) contained in the polymer having the repeating unit represented by Formula (X) is not particularly limited, and is preferably 60 mol % or more and more preferably 80 mol % or more with respect to all the repeating units in the polymer. The upper limit of the content of the repeating unit represented by Formula (X) is 100 mol %.

The molecular weight of the polymer having the repeating unit represented by Formula (X) is not particularly limited, and the number of the repeating units represented by Formula (X) in the polymer is preferably 2 or more, more preferably 10 to 100,000, and still more preferably 100 to 10,000.

In addition, the number average molecular weight of the polymer having the repeating unit represented by Formula (X) is not particularly limited, and is preferably 5,000 to 50,000 and more preferably 10,000 to 30,000.

In addition, the molecular weight distribution of the polymer having the repeating unit represented by Formula (X) is not particularly limited, and is preferably 1.0 to 12.0 and more preferably 1.0 to 7.0.

Here, the number average molecular weight and the molecular weight distribution in the present invention are values measured by a gel permeation chromatograph (GPC) method.

Solvent (eluent): 20 mM phosphoric acid (pH 7.0)/acetonitrile=4/1

Device name: TOSOH HLC-8220GPC

Column: G6000PWxL, 4500PWxL, and G2500pWwL (manufactured by Tosoh Corporation) connected in series Column temperature: 40° C.

Sample concentration: 2 mg/mL

Flow rate: 1 m/min

Calibration curve: a calibration curve with 8 samples of polystyrene sulfonic acid (PSS) having Mp=891k, 4.2k, 10.2k, 29.5k, 78.4k, 152k, 258k, and 462k.

(Plate-Like Compound)

The composition contains a non-colorable plate-like compound (hereinafter, also simply referred to as "plate-like compound").

The plate-like compound exhibits non-colorability.

The term "non-colorable" means showing no absorption in a visible light range. More specifically, it means that the absorbance in a visible light range (wavelength of 400 to 700 nm) is 0.1 or less in a case of measuring the ultraviolet-visible absorption spectrum of a solution in which a plate-like compound is dissolved at a concentration such that the absorbance at the maximum absorption wavelength in an ultraviolet light range (wavelength of 230 to 400 nm) is 1.0.

The "plate-like compound" refers to a compound having a structure in which an aromatic ring (an aromatic hydrocarbon ring, an aromatic heterocyclic ring, or the like) spreads two-dimensionally through a single bond or an appropriate linking group, and refers to a group of compounds having a property of forming a column-like associate by associating planes in a compound with each other in a solvent.

The plate-like compound preferably exhibits lyotropic liquid crystallinity. That is, the plate-like compound is preferably a non-colorable lyotropic liquid crystal compound (non-colorable lyotropic liquid crystal plate-like compound).

The plate-like compound is preferably water-soluble from the viewpoint that it is easy to control the expression of liquid crystallinity. The water-soluble plate-like compound represents a plate-like compound that dissolves in 1% by mass or more in water, and is preferably a plate-like compound that dissolves in 5% by mass or more in water.

The plate-like compound preferably has a maximum absorption wavelength in a wavelength range of longer than 300 nm. That is, the plate-like compound preferably has a maximum absorption peak in a wavelength range of longer than 300 nm.

The maximum absorption wavelength of the plate-like compound means a wavelength at which the absorbance takes a maximal value in the absorption spectrum of the plate-like compound (measurement range: wavelength range of 230 to 400 nm). In a case where there are a plurality of maximal values in the absorbance of the absorption spectrum of the plate-like compound, the wavelength on the longest wavelength side in the measurement range is selected.

Above all, from the viewpoint that the effect of the present invention is excellent, the plate-like compound preferably has a maximum absorption wavelength in a range of 320 to 400 nm, and more preferably has a maximum absorption wavelength in a range of 330 to 360 nm.

The method for measuring the maximum absorption wavelength is as follows.

A plate-like compound (0.01 to 0.05 mmol) is dissolved in pure water (1000 ml), and the absorption spectrum of the obtained solution is measured using a spectrophotometer (MPC-3100, manufactured by Shimadzu Corporation).

$Nz^P$ represented by Expression (N) of the plate-like compound is negative. Above all, $Nz^P$ is preferably −0.45 to −0.10, more preferably −0.30 to −0.15, and still more preferably −0.25 to −0.19, from the viewpoint that the effect of the present invention is more excellent.

$Nz^P$ and the wavelength dispersibility D which will be described later are the optical properties of the optically anisotropic film of the plate-like compound as will be described later, and these optical properties correspond to the optical properties exhibited by the plate-like compound in the optically anisotropic film.

$$Nz^P = (nx^P - nz^P)/(nx^P - ny^P) \quad \text{Expression (N)}$$

$nx^P$ represents a refractive index in an in-plane slow axis direction of an optically anisotropic film P, which is formed by using a mixed solution P1 obtained by mixing 10 parts by mass of a non-colorable plate-like compound and 90 parts by mass of water, in a case where the composition does not contain a salt, or is formed by using a mixed solution P2 obtained by mixing 10 parts by mass of a non-colorable plate-like compound, 90 parts by mass of water, and an amount of salt having the same content ratio as the content ratio of the salt to the plate-like compound in the composition, in a case where the composition contains the salt. $ny^P$ represents a refractive index in an in-plane fast axis direction of the optically anisotropic film P. $nz^P$ represents a refractive index in a thickness direction of the optically anisotropic film P. $nx^P$, $ny^P$, and $nz^P$ are the respective refractive indexes at a wavelength of 550 nm.

That is, the optically anisotropic film P is an optically anisotropic film formed by using the mixed solution P1 obtained by mixing 10 parts by mass of a plate-like compound and 90 parts by mass of water, in a case where the composition does not contain a salt, or an optically anisotropic film formed by using the mixed solution P2 obtained by mixing 10 parts by mass of a plate-like compound, 90 parts by mass of water, and an amount of salt having the same content ratio as the content ratio of the salt to the plate-like compound in the composition, in a case where the composition contains the salt.

As a method for preparing the optically anisotropic film P, the mixed solution P1 or the mixed solution P2 is applied onto a glass substrate with a #4 wire bar (moving speed: 100 cm/s) and then naturally dried at room temperature (20° C.) to prepare the optically anisotropic film P (film thickness: about 240 nm).

As described above, in a case where the composition contains a salt, the mixed solution P2 also contains a predetermined amount of salt. Specifically, an amount of salt having the same content ratio as the content ratio of the salt to the plate-like compound in the composition is added to the mixed solution P2 to prepare the optically anisotropic film P.

That is, in a case where the composition contains a plate-like compound and a salt, the mixed solution P2 contains 10 parts by mass of the plate-like compound, 90 parts by mass of water, and a predetermined amount of salt (parts by mass) having the same content ratio as the content ratio of the salt to the plate-like compound (mass content of salt/mass content of plate-like compound) in the composition. More specifically, in a case where the content ratio of the salt to the plate-like compound (mass content of salt/mass content of plate-like compound) in the composition is 1/10, the mixed solution P2 contains 10 parts by mass of the plate-like compound, 90 parts by mass of water, and 1 part by mass of salt.

The type of the plate-like compound contained in the mixed solution P1 and the mixed solution P2 is the same as that of the plate-like compound in the composition.

The type of salt contained in the mixed solution P2 is the same as that of salt in the composition.

The wavelength dispersibility $D^P$ of the optically anisotropic film P is preferably 1.20 to 1.30 from the viewpoint that the effect of the present invention is more excellent.

$$\text{Wavelength dispersibility } D^P = Re(450)^P/Re(550)^P \quad \text{Expression (P)}$$

$Re(450)^P$ represents the in-plane retardation of the optically anisotropic film P at a wavelength of 450 nm. $Re(550)^P$ represents the in-plane retardation of the optically anisotropic film P at a wavelength of 550 nm.

As described above, the wavelength dispersibility $D^P$ represents the relationship of the in-plane retardation of the optically anisotropic film P formed by using the plate-like compound.

In addition, $Nz^{P1}$ represented by Expression (N1) of the plate-like compound is negative. Above all, $Nz^{P1}$ is preferably −0.45 to −0.10, more preferably −0.30 to −0.15, and still more preferably −0.25 to −0.19, from the viewpoint that the effect of the present invention is more excellent.

$Nz^{P1}$ is the optical property of the optically anisotropic film of the plate-like compound as will be described later, and this optical property corresponds to the optical property exhibited by the plate-like compound in the optically anisotropic film.

$$Nz^{P1} = (nx^{P1} - nz^{P1})/(nx^{P1} - ny^{P1}) \quad \text{Expression (N1)}$$

$nx^{P1}$ represents a refractive index in an in-plane slow axis direction of an optically anisotropic film P1, which is formed by using a mixed solution P3 obtained by mixing a non-colorable plate-like compound and water and exhibiting lyotropic liquid crystallinity at 20° C., in a case where the composition does not contain a salt, or is formed by using a mixed solution P4 obtained by mixing a non-colorable plate-like compound, water, and an amount of salt having the same content ratio as the content ratio of the salt to the plate-like compound in the composition and exhibiting lyotropic liquid crystallinity at 20° C., in a case where the composition contains the salt. $ny^{P1}$ represents a refractive index in an in-plane fast axis direction of the optically anisotropic film P1. $nz^{P1}$ represents a refractive index in a thickness direction of the optically anisotropic film P1. $nx^{P1}$, $ny^{P1}$ and $nz^{P1}$ are the respective refractive indexes at a wavelength of 550 nm.

That is, the optically anisotropic film P1 is an optically anisotropic film formed by using the mixed solution P3 obtained by mixing a plate-like compound and water and exhibiting lyotropic liquid crystallinity at 20° C., in a case where the composition does not contain a salt, or an optically anisotropic film formed by using the mixed solution P4 obtained by mixing a plate-like compound, water, and an amount of salt having the same content ratio as the content ratio of the salt to the plate-like compound in the composition and exhibiting lyotropic liquid crystallinity at 20° C., in a case where the composition contains the salt.

As a method for preparing the optically anisotropic film P1, the mixed solution P3 or the mixed solution P4 is applied onto a glass substrate with a #4 wire bar (moving speed: 100 cm/s) and then naturally dried at room temperature (20° C.) to prepare the optically anisotropic film P1 (film thickness: about 240 nm).

As described above, in a case where the composition contains a salt, the mixed solution P4 also contains a predetermined amount of salt. Specifically, an amount of salt having the same content ratio as the content ratio of the salt to the plate-like compound in the composition is added to the mixed solution P4 to prepare the optically anisotropic film P1.

That is, in a case where the composition contains a plate-like compound and a salt, the mixed solution P4 contains a plate-like compound, water, and a predetermined amount of salt (parts by mass) having the same content ratio as the content ratio of the salt to the plate-like compound (mass content of salt/mass content of plate-like compound) in the composition. More specifically, in a case where the content ratio of the salt to the plate-like compound (mass content of salt/mass content of plate-like compound) in the composition is 1/10, and the amount of the plate-like compound used in the mixed solution P4 is 10 parts by mass, the composition contains 1 part by mass of salt.

The type of the plate-like compound contained in the mixed solution P3 and the mixed solution P4 is the same as that of the plate-like compound in the composition.

The type of salt contained in the mixed solution P4 is the same as that of salt in the composition.

In the mixed solution P3, a mixing ratio of the plate-like compound and water is not particularly limited as long as the lyotropic liquid crystallinity is exhibited at 20° C. Even in a case where the mixing ratio is changed, the optical properties ($nx^{P1}$, $ny^{P1}$, and $nz^{P1}$) of the optically anisotropic film P1 obtained by the above procedure do not change.

In addition, also in the mixed solution P4, a mixing ratio of the plate-like compound and water is not particularly limited as long as the lyotropic liquid crystallinity is exhibited at 20° C. Even in a case where the mixing ratio is changed, the optical properties ($nx^{P1}$, $ny^{P1}$, and $nz^{P1}$) of the optically anisotropic film P1 obtained by the above procedure do not change.

The plate-like compound preferably has a hydrophilic group from the viewpoint that the effect of the present invention is more excellent.

The definition of the hydrophilic group is as described above.

The plate-like compound may have only one hydrophilic group or may have a plurality of hydrophilic groups. In a case where the plate-like compound has a plurality of hydrophilic groups, the number of hydrophilic groups is preferably 2 to 4 and more preferably 2.

The plate-like compound is preferably a compound represented by Formula (Y), from the viewpoint that the effect of the present invention is more excellent.

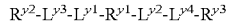  Formula (Y)

$R^{Y1}$ represents a divalent monocyclic group or a divalent fused polycyclic group.

Examples of the ring contained in the divalent monocyclic group include a monocyclic hydrocarbon ring and a monocyclic heterocyclic ring. The monocyclic hydrocarbon ring may be a monocyclic aromatic hydrocarbon ring or a monocyclic non-aromatic hydrocarbon ring. The monocyclic heterocyclic ring may be a monocyclic aromatic heterocyclic ring or a monocyclic non-aromatic heterocyclic ring.

The divalent monocyclic group is preferably a divalent monocyclic aromatic hydrocarbon ring group or a divalent monocyclic aromatic heterocyclic group from the viewpoint that the effect of the present invention is more excellent.

The number of ring structures contained in the divalent fused polycyclic group is not particularly limited, and is preferably 3 to 10, more preferably 3 to 6, and still more preferably 3 to 4 from the viewpoint that the effect of the present invention is more excellent.

Examples of the ring contained in the divalent fused polycyclic group include a hydrocarbon ring and a heterocyclic ring. The hydrocarbon ring may be an aromatic hydrocarbon ring or a non-aromatic hydrocarbon ring. The heterocyclic ring may be an aromatic heterocyclic ring or a non-aromatic heterocyclic ring.

The divalent fused polycyclic group is preferably composed of an aromatic hydrocarbon ring and a heterocyclic ring from the viewpoint that the effect of the present invention is more excellent. The divalent fused polycyclic group is preferably a conjugated linking group. That is, the divalent fused polycyclic group is preferably a conjugated divalent fused polycyclic group.

Examples of the ring constituting the divalent fused polycyclic group include dibenzothiophene-S,S-dioxide (ring represented by Formula (Y2)), dinaphtho[2,3-b:2',3'-d]furan (ring represented by Formula (Y3)), 121-benzo[b]phenoxazine (ring represented by Formula (Y4)), dibenzo[b,i]oxanthrene (ring represented by Formula (Y5)), benzo[b]naphtho[2',3':5,6]dioxyno[2,3-i]oxanthrene (ring represented by Formula (Y6)), acenaphtho[1,2-b]benzo[g]quinoxaline (ring represented by Formula (Y7)), 9H-acenaphtho[1,2-b]imidazo[4,5-g]quinoxaline (ring represented by Formula (Y8)), dibenzo[b,def]chrysene-7,14-dione (ring represented by Formula (Y9)), and acetonaphthoquinoxaline (ring represented by Formula (Y10)).

That is, examples of the divalent fused polycyclic group include divalent groups formed by removing two hydrogen atoms from the rings represented by Formula (Y2) to Formula (Y10).

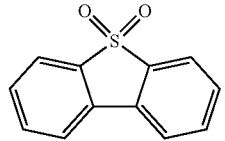 (Y2)

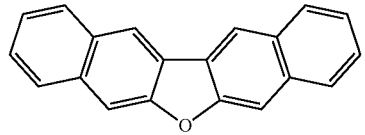 (Y3)

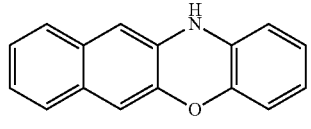 (Y4)

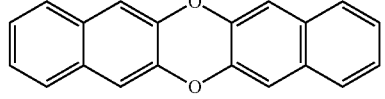 (Y5)

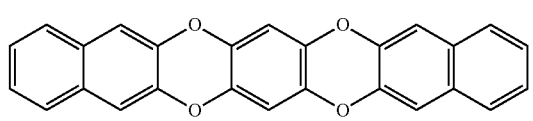 (Y6)

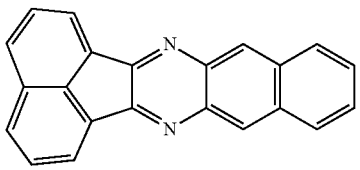 (Y7)

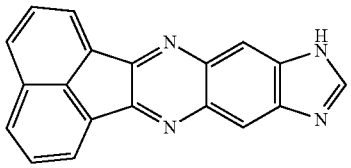 (Y8)

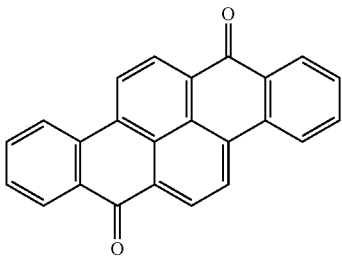 (Y9)

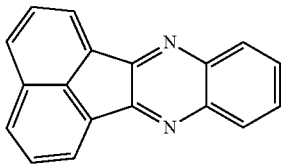 (Y10)

The divalent monocyclic group and the divalent fused polycyclic group may have a substituent. The type of the substituent is not particularly limited, and examples thereof include groups exemplified by substituents other than the substituent containing a hydrophilic group that the divalent aromatic ring group having a substituent containing a hydrophilic group and the divalent non-aromatic ring group having a substituent containing a hydrophilic group represented by $R^{x1}$ have.

$R^{y2}$ and $R^{y3}$ each independently represent a hydrogen atom or a hydrophilic group, and at least one of $R^{y2}$ or $R^{y3}$ represents a hydrophilic group. It is preferable that both $R^{y2}$ and $R^{y3}$ represent a hydrophilic group.

The definition of the hydrophilic group represented by $R^{y2}$ and $R^{y3}$ is as described above.

$L^{y1}$ and $L^{y2}$ each independently represent a single bond, a divalent aromatic ring group, or a group represented by Formula (Y1). In this regard, in a case where $R^{y1}$ is a divalent monocyclic group, both $L^{y1}$ and $L^{y2}$ represent a divalent aromatic ring group or a group represented by Formula (Y1). In Formula (Y1), * represents a bonding position.

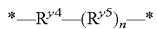 Formula (Y1)

$R^{y4}$ and $R^{y5}$ each independently represent a divalent aromatic ring group, n represents 1 or 2.

The aromatic ring constituting the divalent aromatic ring group represented by $L^{y1}$ and $L^{y2}$ may have a monocyclic structure or a polycyclic structure.

Examples of the aromatic ring constituting the divalent aromatic ring group include an aromatic hydrocarbon ring and an aromatic heterocyclic ring. That is, examples of the divalent aromatic ring group represented by $L^{y1}$ and $L^{y2}$ include a divalent aromatic hydrocarbon ring group and a divalent aromatic heterocyclic group.

Examples of the aromatic hydrocarbon ring include a benzene ring and a naphthalene ring.

Examples of the divalent aromatic hydrocarbon group include the following group. * represents a bonding position.

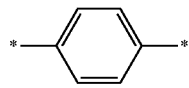 [SMILES: *c1ccc(*)cc1]

Examples of the aromatic heterocyclic ring include a pyridine ring, a thiophene ring, a pyrimidine ring, a thiazole ring, a furan ring, a pyrrole ring, an imidazole ring, and an indole ring.

Examples of the divalent aromatic heterocyclic group include the following groups. * represents a bonding position.

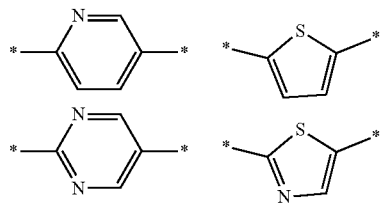

The definition of the divalent aromatic ring group represented by $R^{y4}$ and $R^{y5}$ is the same as that of the divalent aromatic ring group represented by $L^{y1}$ and $L^2$.

$L^{y3}$ and $L^{y4}$ each independently represent a single bond, —O—, —S—, an alkylene group, an alkenylene group, an alkynylene group, or a group formed by a combination thereof.

Examples of the group formed by a combination thereof include an —O-alkylene group and an —S-alkylene group.

The number of carbon atoms in the alkylene group is not particularly limited, and is preferably 1 to 3 and more preferably 1 from the viewpoint that the effect of the present invention is more excellent.

The number of carbon atoms in the alkenylene group and the alkynylene group is not particularly limited, and is preferably 2 to 5 and more preferably 2 to 4 from the viewpoint that the effect of the present invention is more excellent.

<Other Components>

The composition may contain components other than the rod-like compound and the plate-like compound.

The composition may contain a salt (a salt consisting of a cation and an anion). As described above, in a case where the plate-like compound has an acid group or a salt thereof and then in a case where a salt is contained in the composition, the planes in the plate-like compound are more likely to associate with each other, and therefore a column-like associate is likely to be formed.

The salt is not particularly limited, and may be an inorganic salt or an organic salt, among which an inorganic salt is preferable from the viewpoint that the effect of the present invention is more excellent. Examples of the inorganic salt include an alkali metal salt, an alkaline earth metal salt, and a transition metal salt, among which an alkali metal salt is preferable from the viewpoint that the effect of the present invention is more excellent.

The alkali metal salt is a salt in which the cation is an alkali metal ion, and the alkali metal ion is preferably a lithium ion or a sodium ion, and more preferably a lithium ion. That is, the salt is preferably a lithium salt or a sodium salt, and more preferably a lithium salt.

Examples of the alkali metal salt include hydroxides of alkali metals such as lithium hydroxide, sodium hydroxide, and potassium hydroxide; carbonates of alkali metals such as lithium carbonate, sodium carbonate, and potassium carbonate; and hydrogen carbonates of alkali metals such as lithium hydrogen carbonate, sodium hydrogen carbonate, and potassium hydrogen carbonate.

In addition to the above salts, the alkali metal salt may be, for example, a phosphate or a chloride.

Examples of the anion of the salt include a hydroxide ion, a carbonate ion, a chloride ion, a sulfate ion, a nitrate ion, a phosphate ion, a borate ion, a tetrafluoroborate ion, a hexafluorophosphate ion, a perchlorate ion, a toluene sulfonate ion, an oxalate ion, a formate ion, a trifluoroacetate ion, a trifluoromethanesulfonate ion, a hexafluorophosphate ion, a bis(fluoromethanesulfonyl)imide ion, a bis(pentafluorocthanesulfonyl)imide ion, and a bis(trifluoromethanesulfonyl)imide ion.

In a case where the plate-like compound has a salt of an acid group, it is preferable that the cation in the salt of an acid group and the cation in the salt used above are of the same type.

The composition may contain a solvent. Examples of the solvent include water, a polar solvent such as alcohol or dimethylformamide, and a non-polar solvent such as hexane. Of these, a polar solvent is preferable, and water and alcohol are more preferable.

Examples of the additives that may be contained in the composition include a polymerizable compound, a polymerization initiator, a wavelength dispersion control agent, an optical property adjuster, a surfactant, an adhesion improver, a slipping agent, an alignment control agent, and an ultraviolet absorber, in addition to the foregoing components.

<Composition of Composition>

The composition contains at least a rod-like compound and a plate-like compound.

The composition corresponds to a lyotropic liquid crystalline composition.

Here, the lyotropic liquid crystalline composition is a composition having a property of causing a phase transition between an isotropic phase and a liquid crystal phase by changing a temperature or a concentration in a solution state. That is, the composition is a composition capable of exhibiting lyotropic liquid crystallinity by adjusting the concentration of each compound or the like in a solution state containing various components such as a rod-like compound, a plate-like compound, and a solvent. Even in a case where a composition contains an excess solvent and does not exhibit lyotropic liquid crystallinity in that state, the composition corresponds to the above-mentioned lyotropic liquid crystalline composition in a case where the lyotropic liquid crystallinity is exhibited with a change of concentration, such as a case where the lyotropic liquid crystallinity is exhibited in a drying step after application of the composition.

The content of the rod-like compound and the plate-like compound in the composition is not particularly limited, and is preferably 60% to 100% by mass and more preferably 80% to 99% by mass with respect to the total solid content in the composition.

The total solid content means a component that can form an optically anisotropic film, excluding a solvent. Even in a case where the property of the component is liquid, it is calculated as solid content.

The composition may contain only one type of rod-like compound, or may contain two or more types of rod-like compounds.

The composition may contain only one type of plate-like compound, or may contain two or more types of plate-like compounds.

The content of the rod-like compound with respect to the total mass of the rod-like compound and the plate-like compound in the composition is not particularly limited, and is preferably more than 50% by mass and more preferably 55% by mass or more from the viewpoint that the effect of the present invention is excellent. The upper limit of the content of the rod-like compound is not particularly limited, and is preferably 90% by mass or less and more preferably 80% by mass or less.

In a case where the composition contains a salt, the content of the salt is not particularly limited, and a ratio W determined by Expression (W) is preferably 0.25 to 1.75, more preferably 0.50 to 1.50, and still more preferably 0.75 to 1.15 from the viewpoint that the effect of the present invention is more excellent.

$$\text{Ratio } W = \frac{(C1 + C2 + C3) - (A1 + A2)}{A2} \quad (W)$$

In Expression (W), C1 represents a molar amount of a cation contained in a salt of an acid group contained in the rod-like compound. In a case where the rod-like compound does not have the salt of an acid group, C1 is 0.

C2 represents a molar amount of a cation contained in a salt of an acid group contained in the plate-like compound. In a case where the plate-like compound does not have the salt of an acid group, C2 is 0.

C3 represents a molar amount of a cation contained in a salt.

A1 represents a total molar amount of an acid group or a salt thereof contained in the rod-like compound. In a case where the rod-like compound contains both the acid group and the salt of the acid group, the total molar amount represents a total of the molar amount of the acid group and the molar amount of the salt of the acid group. In a case where the rod-like compound has only one of the acid group and the salt of the acid group, the molar amount of the other one not contained is 0.

A2 represents a total molar amount of an acid group or a salt thereof contained in the plate-like compound. In a case where the plate-like compound contains both the acid group and the salt of the acid group, the total molar amount represents a total of the molar amount of the acid group and the molar amount of the salt of the acid group. In a case where the plate-like compound has only one of the acid group and the salt of the acid group, the molar amount of the other one not contained is 0.

For example, in a composition containing a rod-like compound having a $SO_3Li$ group, a plate-like compound having a $SO_3Li$ group, and LiOH, in a case where the molar amount of the $SO_3Li$ group contained in the rod-like compound is 5 mmol, the molar amount of the $SO_3Li$ group contained in the plate-like compound is 8 mmol, and the molar amount of LiOH is 8 mmol, the molar amount of the cation contained in the salt of the acid group contained in the rod-like compound is calculated as 5 mmol, the molar amount of the cation contained in the salt of the acid group contained in the plate-like compound is calculated as 8 mmol, and the molar amount of the cation contained in the LiOH is calculated as 8 mmol, and therefore the ratio W is calculated as $\{(5+8+8)-(5+8)\}/8=1$.

In a case where the rod-like compound is a rod-like compound having an $SO_3H$ group and the molar amount of the $SO_3H$ group contained in the rod-like compound is 5 mmol, the ratio W is calculated as $\{(8+8)-(5+8)\}/8=0.375$.

The ratio W represents an amount of cations derived from an excess of salt in the composition with respect to the acid group or the salt thereof contained in the plate-like compound. That is, the ratio W represents a ratio of the amount of excess cations that do not form a salt with the acid group contained in the rod-like compound and the plate-like compound in the composition, with respect to the acid group or the salt thereof contained in the plate-like compound. In a case where the composition contains a predetermined amount of cations with respect to the acid group or the salt thereof contained in the plate-like compound, the plate-like compound tends to have a predetermined structure in the optically anisotropic film, and therefore a desired optically anisotropic film can be easily obtained.

In a case where the composition contains a salt, the mass ratio of the content of the salt to the content of the plate-like compound in the composition is not particularly limited, and is preferably 0.010 to 0.300, more preferably 0.010 to 0.200, and still more preferably 0.025 to 0.150.

As described above, the composition may contain a solvent.

The concentration of solid contents of the composition is not particularly limited, and is preferably 1% to 50% by mass and more preferably 3% to 30% by mass with respect to the total mass of the composition, from the viewpoint that the effect of the present invention is excellent.

As described above, the composition is a lyotropic liquid crystalline composition. Therefore, the composition may be a composition that contains a predetermined amount of solvent and exhibits lyotropic liquid crystallinity (a state in which lyotropic liquid crystallinity is exhibited), or may be a composition that contains an excessive amount of solvent and therefore does not exhibit lyotropic liquid crystallinity in that state (exhibits an isotropic phase), but exhibits lyotropic liquid crystallinity during the formation of a coating film due to volatilization of a solvent in a case where an optically anisotropic film is formed.

As will be described later, in a case where an alignment film is disposed on a support, the lyotropic liquid crystallinity is exhibited in the drying process after the application of the composition, so that the alignment of the compound is induced, and then it becomes possible to form an optically anisotropic film.

<Method for Producing Optically Anisotropic Film>

The method for producing the optically anisotropic film according to the embodiment of the present invention is not particularly limited as long as the above-mentioned composition is used. For example, a method of applying a composition and aligning a rod-like compound and a plate-like compound in a coating film to form an optically anisotropic film is preferable.

Hereinafter, the procedure of the above method will be described in detail.

First, the composition is applied. Usually, the composition is often applied onto a support.

The support used is a member that functions as a substrate for applying the composition. The support may be a so-called temporary support.

Examples of the support (temporary support) include a plastic substrate and a glass substrate. Examples of the material constituting the plastic substrate include a polyester resin such as polyethylene terephthalate, a polycarbonate resin, a (meth)acrylic resin, an epoxy resin, a polyurethane resin, a polyamide resin, a polyolefin resin, a cellulose resin, a silicone resin, and a polyvinyl alcohol.

The thickness of the support may be about 5 to 1,000 μm, preferably 10 to 250 μm, and more preferably 15 to 90 μm.

If necessary, an alignment film may be disposed on the support.

The alignment film generally contains a polymer as a main component. The polymer for the alignment film has been described in a large number of documents, and a large number of commercially available products are available. The polymer for the alignment film is preferably a polyvinyl alcohol, a polyimide, or a derivative thereof.

It is preferable that the alignment film is subjected to a known rubbing treatment.

In addition, a photo-alignment film may be used as the alignment film.

The thickness of the alignment film is preferably 0.01 to 10 μm and more preferably 0.01 to 1 μm.

The application method may be, for example, a known method, examples of which include a curtain coating method, an extrusion coating method, a roll coating method, a dip coating method, a spin coating method, a print coating method, a spray coating method, and a slide coating method.

In addition, in a case where an application method in which shear is applied is adopted, two treatments of the compound alignment and the application can be carried out at the same time.

In addition, by means of continuous application, the rod-like compound and the plate-like compound may be continuously aligned at the same time as the application. Examples of the continuous application include a curtain coating method, an extrusion coating method, a roll coating method, and a slide coating method. As a specific application unit, it is preferable to use a die coater, a blade coater, or a bar coater.

As a means for aligning a rod-like compound and a plate-like compound in a coating film, a method of applying shear can be mentioned as described above.

If necessary, the coating film formed on the support may be subjected to a heat treatment.

The conditions for heating the coating film are not particularly limited, and the heating temperature is preferably 50° C. to 250° C., and the heating time is preferably 10 seconds to 10 minutes.

In addition, after heating the coating film, the coating film may be cooled if necessary. The cooling temperature is preferably 20° C. to 200° C. and more preferably 20° C. to 150° C.

As another means for aligning a rod-like compound and a plate-like compound in a coating film, a method using an alignment film can be mentioned as described above.

The alignment direction can be controlled by carrying out an alignment treatment in a predetermined direction on the alignment film in advance. In particular, in a case where continuous application is carried out using a roll-like support and then in a case where the liquid crystal compound is aligned obliquely with respect to a transport direction, the method using an alignment film is preferable.

In the method using an alignment film, the concentration of the solvent in the composition used is not particularly limited, and may be a concentration such that the composition exhibits lyotropic liquid crystallinity, or may be a concentration equal to or lower than that composition. As described above, the composition is a lyotropic liquid crystalline composition, and therefore even in a case where the concentration of the solvent in the composition is high (even in a case where the composition itself shows an isotropic phase), the lyotropic liquid crystallinity is exhibited in the drying process after the application of the composition, so that the alignment of the compound is induced on the alignment film, and then it becomes possible to form an optically anisotropic film.

After forming the optically anisotropic film, a treatment for fixing the alignment state of the rod-like compound and the plate-like compound may be carried out, if necessary.

The method for fixing the alignment state of the rod-like compound and the plate-like compound is not particularly limited, and examples thereof include a method of heating and then cooling a coating film as described above.

In addition, in a case where at least one of the rod-like compound or the plate-like compound has an acid group or a salt thereof, the method for fixing the alignment state of the rod-like compound and the plate-like compound may be, for example, a method in which a solution containing polyvalent metal ions is brought into contact with the formed coating film. In a case where the solution containing polyvalent metal ions is brought into contact with the formed coating film, the polyvalent metal ions are supplied into the coating film. The polyvalent metal ion supplied into the coating film serves as a cross-linking point between the acid groups or salts thereof contained in the rod-like compound and/or the plate-like compound, a crosslinking structure is formed in the coating film, and then the alignment state of the rod-like compound and the plate-like compound is immobilized.

The type of polyvalent metal ion used is not particularly limited, and is preferably an alkaline earth metal ion and more preferably a calcium ion from the viewpoint that the alignment state of the rod-like compound and the plate-like compound is easily fixed.

<Characteristics of Optically Anisotropic Film>

In a case where a measurement to obtain an ultraviolet-visible absorption spectrum by applying linearly polarized light from a normal direction of the optically anisotropic film is carried out by changing a direction of the linearly polarized light and assuming that a direction in which an absorbance at a maximum absorption wavelength in a wavelength range of 230 to 400 nm of the rod-like compound is the highest is defined as a first direction, and a direction in which an absorbance at a maximum absorption wavelength in a wavelength range of 230 to 400 nm of the plate-like compound is the highest is defined as a second direction, the first direction and the second direction are orthogonal to each other.

Figure 5:
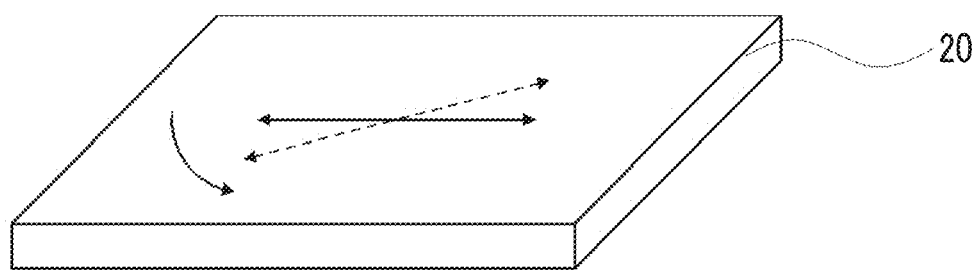
FIG. 5 is a schematic diagram for explaining a method for obtaining an ultraviolet-visible absorption spectrum by applying linearly polarized light from a normal direction of an optically anisotropic film.

As the above-mentioned measurement method, for example, as shown in FIG. 5, there is a method of carrying out a measurement to obtain an ultraviolet-visible absorption spectrum while changing the direction of linearly polarized light in such a manner that an optically anisotropic film 20 is irradiated with linearly polarized light indicated by a linear solid line to obtain an ultraviolet-visible absorption spectrum, the direction of the linearly polarized light is changed (the direction of the linearly polarized light is changed counterclockwise), and the optically anisotropic film 20 is irradiated with the linearly polarized light indicated by a linear broken line to obtain an ultraviolet-visible absorption spectrum.

As described above, the above characteristics show the arrangement of the rod-like compound and the plate-like compound as shown in FIG. 1. In FIG. 1, the direction in which the absorbance at a maximum absorption wavelength in a wavelength range of 230 to 400 nm of the rod-like compound is the highest corresponds to the x-axis direction, and the direction in which the absorbance at a maximum absorption wavelength in a wavelength range of 230 to 400 nm of the plate-like compound is the highest corresponds to the y-axis direction.

As described above, the term "orthogonal" means that it is in a range of 90°±5° (85° to 95°), and is preferably in a range of 90±3° (87° to 93°).

The measurement methods of the first direction and the second direction are not particularly limited, and known methods are adopted.

The first direction and the second direction can be obtained, as described above, by carrying out a measurement of applying linearly polarized light from a normal direction of an optically anisotropic film to obtain an ultraviolet-visible absorption spectrum by changing the direction of the linearly polarized light (direction of a polarization axis of the linearly polarized light). The method of changing the direction of linearly polarized light may be, for example, a method of rotating an optically anisotropic film.

The Nz factor of the optically anisotropic film satisfies the relationship of Expression (1).

$$0.40 \leq Nz \text{ factor} \leq 0.60 \qquad \text{Expression (1)}$$

Above all, the Nz factor is preferably 0.42 to 0.58 and more preferably 0.45 to 0.54.

The optically anisotropic film exhibits reverse wavelength dispersibility. The reverse wavelength dispersibility means that, in a case where the in-plane retardation (Re) value is measured, the Re value becomes equal to or higher than an increase in wavelength as the measurement wavelength becomes longer, in a wavelength range of at least a part of a visible light range. In the present invention, it is sufficient that the optically anisotropic film exhibits reverse wavelength dispersibility by satisfying the relationship of Expression (2) and Expression (3).

$$Re(450)/Re(550) < 1.00 \qquad \text{Expression (2)}$$

Re(450) represents the in-plane retardation of the optically anisotropic film at a wavelength of 450 nm, and Re(550) represents the in-plane retardation of the optically anisotropic film at a wavelength of 550 nm.

Above all, the Re(450)/Re(550) is preferably 0.87 or less and more preferably 0.85 or less. In addition, the Re(450)/Re(550) is preferably 0.60 or more, more preferably 0.72 or more, and still more preferably 0.82 or more.

$$Re(650)/Re(550) > 1.00 \qquad \text{Expression (3)}$$

The Re(650) represents the in-plane retardation of the optically anisotropic film at a wavelength of 650 nm.

Above all, the Re(650)/Re(550) is preferably 1.02 or more and more preferably 1.05 or more. The upper limit of the Re(650)/Re(550) is not particularly limited, and is preferably 1.25 or less and more preferably 1.20 or less.

The Re(550) of the optically anisotropic film is not particularly limited, and is preferably 110 to 160 nm and more preferably 120 to 150 nm from the viewpoint that it is useful as a λ/4 plate.

The Rth(550) of the optically anisotropic film is not particularly limited, and is preferably −50 to 40 nm and more preferably −40 to 30 nm.

The alignment degree of the rod-like compound in the optically anisotropic film is preferably 0.60 or more, and the alignment degree of the plate-like compound in the optically anisotropic film is preferably 0.60 or more.

The upper limit of each of the alignment degree of the rod-like compound and the alignment degree of the rod-like compound is not particularly limited, and may be, for example, 1.00.

The alignment degree of the rod-like compound represents a degree of alignment of the rod-like compound in the optically anisotropic film, and an upper limit value thereof is 1.0 as shown by the expression which will be described later. As the alignment degree of the rod-like compound approaches 1.0, a molecular axis of the rod-like compound (a direction in which the rod-like compound extends) is arranged along one direction.

The alignment degree of the plate-like compound represents a degree of alignment of the plate-like compound in the optically anisotropic film, and an upper limit value thereof is 1.0 as shown by the expression which will be described later. As the alignment degree of the plate-like compound approaches 1.0, a major axis of the plate-like compound is arranged along one direction.

The alignment degree of the rod-like compound and the alignment degree of the plate-like compound can be calculated from the following expression using an absorbance Ax in the direction in which an absorption derived from each compound is the largest (hereinafter, also simply referred to as "first direction") and an absorbance Ay in the direction orthogonal to the first direction (hereinafter, also simply referred to as "second direction").

Alignment degree=$[(Ax/Ay)-1]/[(Ax/Ay)+2]$

For example, in a case of calculating the alignment degree of the plate-like compound, an absorbance $Ax^P$ in the direction in which an absorption derived from the plate-like compound is the largest in the in-plane direction of the optically anisotropic film and an absorbance $Ay^P$ in the direction orthogonal to the above direction are calculated and the respective values are substituted into the above expression to calculate the alignment degree of the plate-like compound.

As the absorption derived from each compound, it is preferable to use an absorption at the maximum absorption wavelength on the longest wavelength side among the maximum absorption wavelengths of each compound in a wavelength range of 230 to 400 nm. For example, in a case where the absorption on the longest wavelength side among the maximum absorption wavelengths of the plate-like compound in a wavelength range of 230 to 400 nm is 345 nm, the direction in which the absorption at 345 nm is the largest is the first direction, and the second direction corresponds to the direction orthogonal to the first direction.

In addition, as will be described later, it is preferable that the maximum absorption wavelength of the rod-like compound is smaller than the maximum absorption wavelength of the plate-like compound. In such a case, in a case of measuring the absorbance of the rod-like compound at the maximum absorption wavelength in the optically anisotropic film, the obtained absorbance partially contains the absorption derived from the plate-like compound. In order to measure the absorbance of the rod-like compound at the maximum absorption wavelength, it can be obtained by subtracting the absorbance due to the absorption derived from the plate-like compound from the absorbance obtained by the measurement. The absorbance due to absorption derived from the plate-like compound can be calculated from a light absorption coefficient of the plate-like compound at that wavelength and a concentration of the plate-like compound in the optically anisotropic film.

The measurement methods of the first direction and the second direction are not particularly limited, and known methods are adopted.

For example, there is a method in which a measurement of applying linearly polarized light from a normal direction of an optically anisotropic film to obtain an ultraviolet-visible absorption spectrum is carried out by changing the direction of the linearly polarized light (direction of a polarization axis of the linearly polarized light).

In addition, from the viewpoint that the effect of the present invention is more excellent, suitable aspects of the optically anisotropic film include aspects 1 to 7 shown in Table 1.

In the aspects 1 to 7, $Nz^R$ of the rod-like compound, $D^R$ of the rod-like compound, alignment degree of the rod-like compound. $Nz^P$ of the plate-like compound, $D^P$ of the plate-like compound, alignment degree of the plate-like compound, and content parentage (% by mass) of the plate-like compound to the total amount of the plate-like compound and the rod-like compound in each optically anisotropic film are represented, respectively. For example, in the optically anisotropic film shown in the aspect 1, $Nz^R$ of the rod-like compound is 0.98 to 1.02, $D^R$ of the rod-like compound is 1.08 to 1.12 (preferably 1.09 to 1.11), alignment degree of the rod-like compound is 0.65 to 0.72, $Nz^P$ of the plate-like compound is −0.25 to −0.15 (preferably −0.25 to −0.19), $D^P$ of the plate-like compound is 1.20 to 1.24, alignment degree of the plate-like compound is 0.65 to 0.72, and content percentage of the plate-like compound to the total amount of the plate-like compound and the rod-like compound is 41% to 44% by mass.

TABLE 1

| | Rod-like compound | | | Plate-like compound | | | |
| --- | --- | --- | --- | --- | --- | --- | --- |
| | $Nz^R$ | $D^R$ | Alignment degree | $Nz^P$ | $D^P$ | Alignment degree | Content |
| Aspect 1 | 0.98 to 1.02 | 1.08 to 1.12 | 0.65 to 0.72 | −0.25 to −0.15 | 1.20 to 1.24 | 0.65 to 0.72 | 41 to 44 |
| Aspect 2 | 0.98 to 1.02 | 1.08 to 1.12 | 0.88 to 0.92 | −0.38 to −0.26 | 1.26 to 1.30 | 0.88 to 0.92 | 37 to 41 |
| Aspect 3 | 0.98 to 1.02 | 1.08 to 1.12 | 0.58 to 0.62 | −0.38 to −0.26 | 1.26 to 1.30 | 0.88 to 0.92 | 28 to 32 |
| Aspect 4 | 0.98 to 1.02 | 1.08 to 1.12 | 0.88 to 0.92 | −0.38 to −0.26 | 1.26 to 1.30 | 0.58 to 0.62 | 47 to 51 |

TABLE 1-continued

| | Rod-like compound | | | Plate-like compound | | | |
|---|---|---|---|---|---|---|---|
| | $Nz^R$ | $D^R$ | Alignment degree | $Nz^P$ | $D^P$ | Alignment degree | Content |
| Aspect 5 | 0.98 to 1.02 | 1.08 to 1.12 | 0.88 to 0.92 | −0.25 to −0.15 | 1.20 to 1.24 | 0.88 to 0.92 | 41 to 44 |
| Aspect 6 | 0.98 to 1.02 | 1.08 to 1.12 | 0.58 to 0.62 | −0.25 to −0.15 | 1.20 to 1.24 | 0.88 to 0.92 | 32 to 35 |
| Aspect 7 | 0.98 to 1.02 | 1.08 to 1.12 | 0.88 to 0.92 | −0.25 to −0.15 | 1.20 to 1.24 | 0.58 to 0.62 | 51 to 54 |

The thickness of the optically anisotropic film is not particularly limited, and is preferably 10 µm or less, more preferably 0.5 to 8.0 µm and still more preferably 0.5 to 6.0 µm from the viewpoint of thinning.

In the present specification, the thickness of the optically anisotropic film means an average thickness of the optically anisotropic film. The average thickness is obtained by measuring the thicknesses of any five or more points of the optically anisotropic film and arithmetically averaging the measured values.

<Uses>

The above-mentioned optically anisotropic film can be applied to various uses and can be used, for example, as a so-called λ/4 plate or λ/2 plate by adjusting the in-plane retardation of the optically anisotropic film.

The λ/4 plate is a plate having a function of converting linearly polarized light having a specific wavelength into circularly polarized light (or circularly polarized light into linearly polarized light). More specifically, the λ/4 plate is a plate in which the in-plane retardation Re at a predetermined wavelength λ nm is λ/4 (or an odd multiple thereof).

The in-plane retardation at a wavelength of 550 nm (Re(550)) of the λ/4 plate may have an error of about 25 nm centered on an ideal value (137.5 nm), and is, for example, preferably 110 to 160 nm and more preferably 120 to 150 nm.

In addition, the λ/2 plate refers to an optically anisotropic film in which the in-plane retardation Re(λ) at a specific wavelength of λ nm satisfies Re(λ)≈λ/2. This expression may be achieved at any wavelength (for example, 550 nm) in the visible light region. Above all, it is preferable that the in-plane retardation Re(550) at a wavelength of 550 nm satisfies the following relationship.

$$210 \text{ nm} \leq Re(550) \leq 300 \text{ nm}$$

<Optical Film>

The optically anisotropic film may be used as an optical film in combination with another layer. That is, the optical film of the present invention includes the above-mentioned optically anisotropic film and another layer.

Examples of the other layer include the above-mentioned alignment film and support.

The arrangement position of the optically anisotropic film in the optical film is not particularly limited, and examples thereof include an aspect having a support, an alignment film, and an optically anisotropic film in this order.

<Polarizing Plate>

The optically anisotropic film according to the embodiment of the present invention can be suitably applied to a polarizing plate.

That is, the polarizing plate (preferably the circularly polarizing plate) according to the embodiment of the present invention includes an optically anisotropic film or an optical film and a polarizer. The circularly polarizing plate is an optical element that converts unpolarized light into circularly polarized light.

The polarizer may be any member having a function of converting light into specific linearly polarized light (linear polarizer), and an absorption type polarizer can be mainly used.

Examples of the absorption type polarizer include an iodine-based polarizer, a dye-based polarizer using a dichroic dye, and a polyene-based polarizer. The iodine-based polarizer and the dye-based polarizer include a coating type polarizer and a stretching type polarizer, both of which can be applied. A polarizer prepared by adsorbing iodine or a dichroic dye on a polyvinyl alcohol, followed by stretching is preferable.

The relationship between the slow axis of the optically anisotropic film and the absorption axis of the polarizer is not particularly limited. In a case where the optically anisotropic film is a λ/4 plate and the optical film is used as a circularly polarizing film, the angle formed by the in-plane slow axis of the optically anisotropic film and the absorption axis of the polarizer is preferably in a range of 45°±10°. That is, the angle formed by the in-plane slow axis of the optically anisotropic film and the absorption axis of the polarizer is preferably in a range of 35° to 55°.

<Display Device>

The circularly polarizing plate according to the embodiment of the present invention can be suitably applied to a display device. That is, the circularly polarizing plate according to the embodiment of the present invention can be suitably used as a so-called antireflection film.

The display device according to the embodiment of the present invention has a display element and the above-mentioned circularly polarizing plate. The circularly polarizing plate is disposed on the viewing side, and the polarizer is disposed on the viewing side in the circularly polarizing plate.

The display device is not particularly limited, and examples thereof include an organic EL display element and a liquid crystal display element, among which an organic EL display element is preferable.

EXAMPLES

Hereinafter, features of the present invention will be described in more detail with reference to Examples and Comparative Examples. The materials, amounts used, proportions, treatment details, and treatment procedure shown in the following Examples can be appropriately changed without departing from the spirit and scope of the present invention. Accordingly, the scope of the present invention should not be construed as being limited by the specific examples given below.

31

<Synthesis>

The following plate-like compounds I-1 to I-5 and rod-like compounds II-1 to II-4 were synthesized by a known method. The plate-like compound I-4 corresponded to a mixture of two types of compounds, and the mixing ratio of the compound on the left side and the compound on the right side (mass of compound on left side/mass of compound on right side) was 1/1. In addition, each of the rod-like compounds II-1 to II-4 was a polymer (n=2 or more), and the rod-like compound II-1 had a number average molecular weight of 24,000 and a molecular weight distribution of 6.8, the rod-like compound II-2 had a number average molecular weight of 30,000 and a molecular weight distribution of 5.7, the rod-like compound II-3 had a number average molecular weight of 25,000 and a molecular weight distribution of 5.1, and the rod-like compound II-4 had a number average molecular weight of 16,000 and a molecular weight distribution of 5.6.

The plate-like compounds I-1 to I-5 and the rod-like compounds II-1 to II-4 all exhibited lyotropic liquid crystallinity.

In addition, the plate-like compounds I-1 to I-5 and the rod-like compounds II-1 to II-4 all satisfied the above-mentioned requirements of non-colorability. More specifically, the absorbance in a visible light range (wavelength of 400 to 700 nm) was 0.1 or less in a case of measuring the ultraviolet-visible absorption spectrum of a solution in which each of the above compounds was dissolved at a concentration such that the absorbance at the maximum absorption wavelength in an ultraviolet light range (wavelength of 230 to 400 nm) was 1.0.

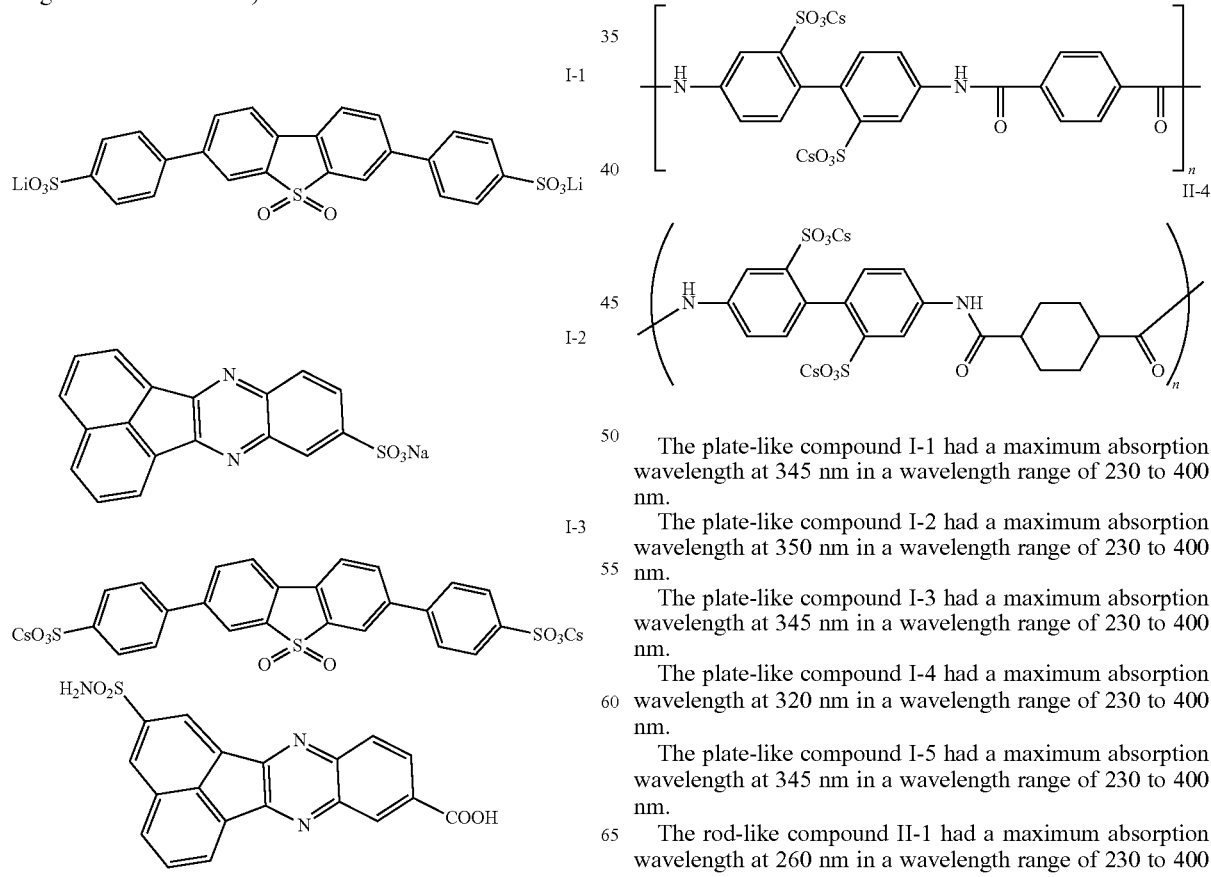

The plate-like compound I-1 had a maximum absorption wavelength at 345 nm in a wavelength range of 230 to 400 nm.

The plate-like compound I-2 had a maximum absorption wavelength at 350 nm in a wavelength range of 230 to 400 nm.

The plate-like compound I-3 had a maximum absorption wavelength at 345 nm in a wavelength range of 230 to 400 nm.

The plate-like compound I-4 had a maximum absorption wavelength at 320 nm in a wavelength range of 230 to 400 nm.

The plate-like compound I-5 had a maximum absorption wavelength at 345 nm in a wavelength range of 230 to 400 nm.

The rod-like compound II-1 had a maximum absorption wavelength at 260 nm in a wavelength range of 230 to 400 nm.

The rod-like compound II-2 had a maximum absorption wavelength at 260 nm in a wavelength range of 230 to 400 nm.

The rod-like compound II-3 had a maximum absorption wavelength at 290 nm in a wavelength range of 230 to 400 nm.

The rod-like compound II-4 had a maximum absorption wavelength at 260 nm in a wavelength range of 230 to 400 nm.

Example 1

A composition 1 for forming an optically anisotropic film having the following composition was prepared. The composition 1 for forming an optically anisotropic film was a composition exhibiting lyotropic liquid crystallinity.

| Composition 1 for forming optically anisotropic film | |
|---|---|
| Plate-like compound I-1 | 4.4 parts by mass |
| Rod-like compound II-1 | 5.6 parts by mass |
| Lithium hydroxide | 0.26 parts by mass |
| Water | 90 parts by mass |

The composition 1 for forming an optically anisotropic film prepared above was applied onto a glass substrate as a substrate with a wire bar (moving speed: 100 cm/s), and then naturally dried at room temperature (20° C.). Next, the obtained coating film was immersed in a 1 mol/L calcium chloride aqueous solution for 5 seconds, washed with ion exchange water, and air-blast dried to immobilize the alignment state, whereby an optically anisotropic film 1 was prepared.

Examples 2 to 10 and Comparative Examples 1 and 2

Optically anisotropic films 2 to 10 and C1 and C2 were prepared in the same manner as in Example 1, except that the rod-like compound or the plate-like compound was changed to the compound shown in Table 2 which will be described later and the amount of lithium hydroxide used was adjusted as shown in Table 2 which will be described later.

In this regard, in Example 10, cesium hydroxide was used instead of lithium hydroxide.

The Re(550) of the optically anisotropic film produced in each of Examples 1 to 10 and Comparative Examples 1 and 2 was 142 nm.

In addition, the above-mentioned ratio W in Example 1 was 0.67, the above-mentioned ratio W in Example 2 was 0.48, the above-mentioned ratio W in Example 3 was 0.61, the above-mentioned ratio W in Example 4 was 0.80, the above-mentioned ratio W in Example 5 was 0.38, the above-mentioned ratio W in Example 6 was 0.96, the above-mentioned ratio W in Example 7 was 0.48, the above-mentioned ratio W in Example 8 was 1.34, and the above-mentioned ratio W in Example 9 was 0.32.

<Evaluation>

The in-plane retardation at each wavelength and Nz factor were measured for the obtained optically anisotropic films 1 to 10 and C1 and C2.

The results are summarized in Table 2.

In Table 2, the column of "DR" represents the wavelength dispersibility $D^R$ represented by Expression (R) of the above-mentioned rod-like compound. The method for measuring the wavelength dispersibility $D^R$ is as described above. For example, in Example 1, the optically anisotropic film R was prepared by the above-mentioned method using a mixed solution R obtained by mixing the rod-like compound II-1 (10 parts by mass) and water (90 parts by mass), and then the wavelength dispersibility $D^R$ was obtained.

In Table 2, the column of "$\lambda^R$" represents the maximum absorption wavelength of the rod-like compound.

In Table 2, the column of "$D^P$" represents the wavelength dispersibility $D^P$ represented by Expression (P) of the above-mentioned plate-like compound.

In Table 2, the column of "$Nz^P$" represents $Nz^P$ represented by Expression (N) of the plate-like compound.

In Table 2, the column of "$Nz^{P1}$" represents $Nz^{P1}$ represented by Expression (N1) of the plate-like compound.

In Table 2, the column of "$\lambda^P$" represents the maximum absorption wavelength of the plate-like compound.

The method for measuring the wavelength dispersibility $D^P$ and $Nz^P$ is as described above. For example, in Example 1, the optically anisotropic film P was prepared by the above-mentioned method using a mixed solution P2 obtained by mixing the plate-like compound I-1 (10 parts by mass), water (90 parts by mass), and lithium hydroxide (0.59 parts by mass), and then the wavelength dispersibility $D^P$ and $Nz^P$ were obtained.

The method for measuring $Nz^{P1}$ is as described above. For example, in Example 1, in a mixed solution P4 obtained by mixing the plate-like compound I-1 (10 parts by mass), water (90 parts by mass), and lithium hydroxide (0.59 parts by mass), since the lyotropic liquid crystallinity was exhibited at 20° C., the optically anisotropic film P1 was prepared by the above-mentioned method using this mixed solution P4 and then $Nz^{P1}$ was obtained. All of a mixed solution P4-1 obtained by mixing the plate-like compound I-1 (5 parts by mass), lithium hydroxide (0.30 parts by mass), and water (95 parts by mass), a mixed solution P4-2 obtained by mixing the plate-like compound I-1 (15 parts by mass), lithium hydroxide (0.89 parts by mass), and water (85 parts by mass), and a mixed solution P4-3 obtained by mixing the plate-like compound I-1 (20 parts by mass), lithium hydroxide (1.18 parts by mass), and water (80 parts by mass) exhibited lyotropic liquid crystallinity at 20° C. Further, in a case where the optically anisotropic film P1 was prepared by the above-mentioned method using each of these mixed solutions P4-1 to P4-3 and $Nz^{P1}$ was measured, all the values were the same as the value (−0.21) obtained by using the mixed solution P4. In other Examples as well, similar to the above, even in a case where the concentration of the plate-like compound was changed, the obtained value of $Nz^{P1}$ was the same as long as the mixed solution exhibited lyotropic liquid crystallinity.

In the column of "Relationship between first direction and second direction" in Table 2, the case where the above-mentioned first direction and second direction are orthogonal to each other is described as "A", and the case where the above-mentioned first direction and second direction are not orthogonal to each other is described as "B".

TABLE 2

| | Rod-like compound | | | Plate-like compound | | | | | Optically anisotropic film Formulation (parts by mass) | |
|---|---|---|---|---|---|---|---|---|---|---|
| | Type | $D^R$ | $\lambda^R$ (nm) | Type | $Nz^P$ | $Nz^{P1}$ | $D^P$ | $\lambda^R$ (nm) | Rod-like compound | Plate-like compound |
| Example 1 | II-1 | 1.10 | 260 | I-1 | −0.21 | −0.21 | 1.22 | 345 | 5.6 | 4.4 |
| Example 2 | II-2 | 1.10 | 260 | I-2 | −0.23 | −0.23 | 1.24 | 350 | 5.6 | 4.4 |
| Example 3 | II-1 | 1.10 | 260 | I-1 | −0.19 | −0.19 | 1.22 | 345 | 5.6 | 4.4 |
| Example 4 | II-1 | 1.10 | 260 | I-1 | −0.25 | −0.25 | 1.22 | 345 | 5.6 | 4.4 |
| Example 5 | II-2 | 1.10 | 260 | I-2 | −0.18 | −0.18 | 1.24 | 350 | 5.4 | 4.6 |
| Example 6 | II-1 | 1.10 | 260 | I-1 | −0.30 | −0.30 | 1.22 | 345 | 5.7 | 4.3 |
| Example 7 | II-1 | 1.10 | 260 | I-1 | −0.15 | −0.15 | 1.22 | 345 | 5.3 | 4.7 |
| Example 8 | II-1 | 1.10 | 260 | I-1 | −0.42 | −0.42 | 1.22 | 345 | 6.3 | 3.7 |
| Example 9 | II-1 | 1.10 | 260 | I-1 | −0.10 | −0.10 | 1.22 | 345 | 5.2 | 4.8 |
| Example 10 | II-4 | 1.10 | 260 | I-5 | −0.10 | −0.10 | 1.22 | 345 | 5.4 | 4.6 |
| Comparative Example 1 | II-3 | 1.18 | 290 | I-3 | 0.4 | 0.4 | 1.23 | 345 | 1.6 | 8.4 |
| Comparative Example 2 | II-3 | 1.18 | 290 | I-4 | 0 | 0 | 1.24 | 320 | 5.2 | 4.8 |

| | Optically anisotropic film | | | | | | | |
|---|---|---|---|---|---|---|---|---|
| | Formulation (parts by mass) | | Alignment degree of rod-like compound | Alignment degree of plate-like compound | Relationship between first direction and second direction | Film thickness (μm) | Evaluation | | |
| | Amount of salt added | Mass ratio of salt to plate-like compound | | | | | Re(450)/Re(550) | Re(650)/Re(550) | Nz |
| Example 1 | 0.26 | 0.059 | 0.68 | 0.65 | A | 2.8 | 0.82 | 1.06 | 0.50 |
| Example 2 | 0.29 | 0.065 | 0.71 | 0.63 | A | 2.5 | 0.81 | 1.06 | 0.52 |
| Example 3 | 0.24 | 0.054 | 0.69 | 0.66 | A | 3.0 | 0.82 | 1.06 | 0.55 |
| Example 4 | 0.31 | 0.071 | 0.72 | 0.65 | A | 2.3 | 0.86 | 1.04 | 0.50 |
| Example 5 | 0.23 | 0.051 | 0.70 | 0.65 | A | 3.1 | 0.72 | 1.08 | 0.51 |
| Example 6 | 0.36 | 0.085 | 0.71 | 0.66 | A | 2.0 | 0.88 | 1.03 | 0.45 |
| Example 7 | 0.20 | 0.042 | 0.69 | 0.64 | A | 3.7 | 0.70 | 1.09 | 0.50 |
| Example 8 | 0.44 | 0.119 | 0.66 | 0.66 | A | 1.6 | 0.94 | 1.00 | 0.44 |
| Example 9 | 0.14 | 0.028 | 0.68 | 0.62 | A | 4.4 | 0.70 | 1.09 | 0.60 |
| Example 10 | 1.31 | 0.284 | 0.68 | 0.62 | A | 4.4 | 0.76 | 1.07 | 0.55 |
| Comparative Example 1 | — | — | 0.70 | 0.65 | A | 0.8 | 1.24 | 0.88 | 0.50 |
| Comparative Example 2 | — | — | 0.69 | 0.64 | A | 9.5 | 0.81 | 1.06 | 1.00 |

As shown in Table 2, the optically anisotropic film according to the embodiment of the present invention exhibited a predetermined effect.

From the comparison of Examples 1 to 10, in a case where $Nz^P$ (or $Nz^{P1}$) is in a range of −0.30 to −0.15 (more preferably, it is in a range of −0.25 to −0.19), it was more excellent in reverse wavelength dispersibility, and the Nz factor showed a value closer to 0.50.

In addition, the "more excellent in reverse wavelength dispersibility" means that the value of Re(450)/Re(550) is closer to 0.82, or the value of Re(650)/Re(550) is closer to 1.18.

EXPLANATION OF REFERENCES

10: support
12: rod-like compound
14: plate-like compound
20: optically anisotropic film

What is claimed is:

1. An optically anisotropic film formed of a lyotropic liquid crystalline composition containing a non-colorable rod-like compound and a non-colorable plate-like compound, wherein, in a case where a measurement to obtain an ultraviolet-visible absorption spectrum by applying linearly polarized light from a normal direction of the optically anisotropic film is carried out by changing a direction of the linearly polarized light and assuming that a direction in which an absorbance at a maximum absorption wavelength in a wavelength range of 230 to 400 nm of the rod-like compound is the highest is defined as a first direction, and a direction in which an absorbance at a maximum absorption wavelength in a wavelength range of 230 to 400 nm of the plate-like compound is the highest is defined as a second direction, the first direction and the second direction are orthogonal to each other, the maximum absorption wavelength in the wavelength range of 230 to 400 nm of the rod-like compound is smaller than the maximum absorption wavelength in the wavelength range of 230 to 400 nm of the plate-like compound, $Nz^P$ represented by Expression (N) of the plate-like compound is negative, $$Nz^P=(nx^P-nz^P)/(nx^P-ny^P) \qquad \text{Expression (N)}$$

$nx^P$ represents a refractive index in an in-plane slow axis direction of an optically anisotropic film P, which is formed by using a mixed solution P1 obtained by mixing 10 parts by mass of the non-colorable plate-like compound and 90 parts by mass of water, in a case where the composition does not contain a salt, or is formed by using a mixed solution P2 obtained by mixing 10 parts by mass of the non-colorable plate-like compound, 90 parts by mass of water, and an amount of the salt having the same content ratio as a content ratio of the salt to the plate-like compound in the composition, in a case where the composition contains the salt, $ny^P$ represents a refractive index in an in-plane fast axis direction of the optically anisotropic film P, and $nz^P$ represents a refractive index in a thickness direction of the optically anisotropic film P, and wherein the $Nz^P$ is −0.25 to −0.19.

2. The optically anisotropic film according to claim 1, wherein both the rod-like compound and the plate-like compound are lyotropic liquid crystal compounds.

3. The optically anisotropic film according to claim 1, wherein the rod-like compound and the plate-like compound have a hydrophilic group.

4. The optically anisotropic film according to claim 1, wherein the rod-like compound is a polymer having a repeating unit represented by Formula (X),

$R^{x1}$ represents a divalent aromatic ring group having a substituent containing a hydrophilic group, a divalent non-aromatic ring group having a substituent containing a hydrophilic group, or a group represented by Formula (X1),

in Formula (X1), * represents a bonding position, $R^{x3}$ and $R^{x4}$ each independently represent a divalent aromatic ring group which may have a substituent containing a hydrophilic group, or a divalent non-aromatic ring group which may have a substituent containing a hydrophilic group, and at least one of $R^{x3}$ or $R^{x4}$ represents a divalent aromatic ring group which has a substituent containing a hydrophilic group, or a divalent non-aromatic ring group which has a substituent containing a hydrophilic group, $L^{x3}$ represents a single bond, —O—, —S—, an alkylene group, an alkenylene group, or an alkynylene group, $R^{x2}$ represents a divalent non-aromatic ring group or a group represented by Formula (X2),

$Z^{x1}$ and $Z^{x2}$ each independently represent a divalent non-aromatic ring group, $L^{x1}$ and $L^{x2}$ each independently represent —CONH—, —COO—, —O—, or —S—, in Formula (X1), * represents a bonding position, and in Formula (X2), * represents a bonding position.

5. The optically anisotropic film according to claim 1, wherein the plate-like compound is a compound represented by Formula (Y),

$R^{y1}$ represents a divalent monocyclic group or a divalent fused polycyclic group, $R^{y2}$ and $R^{y3}$ each independently represent a hydrogen atom or a hydrophilic group, and at least one of $R^{y2}$ or $R^{y3}$ represents a hydrophilic group, $L^{y1}$ and $L^{y2}$ each independently represent a single bond, a divalent aromatic ring group, or a group represented by Formula (Y1), provided that, in a case where $R^{y1}$ is a divalent monocyclic group, both $L^{y1}$ and $L^{y2}$ represent a divalent aromatic ring group or a group represented by Formula (Y1),

$R^{y4}$ and $R^{y5}$ each independently represent a divalent aromatic ring group, n represents 1 or 2, $L^{y3}$ and $L^{y4}$ each independently represent a single bond, —O—, —S—, an alkylene group, an alkenylene group, an alkynylene group, or a group formed by a combination thereof, and in Formula (Y1), * represents a bonding position.

6. A circularly polarizing plate comprising:
the optically anisotropic film according to claim 1; and
a polarizer.

7. The circularly polarizing plate according to claim 6, wherein an angle formed by an in-plane slow axis of the optically anisotropic film and an absorption axis of the polarizer is in a range of 45°±5°.

8. A display device comprising:
the circularly polarizing plate according to claim 6; and
a display element.

9. The display device according to claim 8, wherein the display element is an organic electroluminescence display element.

10. An optically anisotropic film formed of a lyotropic liquid crystalline composition containing a non-colorable rod-like compound and a non-colorable plate-like compound, wherein, in a case where a measurement to obtain an ultraviolet-visible absorption spectrum by applying linearly polarized light from a normal direction of the optically anisotropic film is carried out by changing a direction of the linearly polarized light and assuming that a direction in which an absorbance at a maximum absorption wavelength in a wavelength range of 230 to 400 nm of the rod-like compound is the highest is defined as a first direction, and a direction in which an absorbance at a maximum absorption wavelength in a wavelength range of 230 to 400 nm of the plate-like compound is the highest is defined as a second direction, the first direction and the second direction are orthogonal to each other, the maximum absorption wavelength in the wavelength range of 230 to 400 nm of the rod-like compound is smaller than the maximum absorption wavelength in the wavelength range of 230 to 400 nm of the plate-like compound, $Nz^{P1}$ represented by Expression (N1) of the plate-like compound is negative, $$Nz^{P1}=(nx^{P1}-nz^{P1})/(nx^{P1}-ny^{P1})$$ Expression (N1)

$nx^{P1}$ represents a refractive index in an in-plane slow axis direction of an optically anisotropic film P1, which is formed by using a mixed solution P3 obtained by mixing the non-colorable plate-like compound and water and exhibiting lyotropic liquid crystallinity at 20° C., in a case where the composition does not contain a salt, or is formed by using a mixed solution P4 obtained by mixing the non-colorable plate-like compound, water, and an amount of the salt having the same content ratio as a content ratio of the salt to the plate-like compound in the composition and exhibiting lyotropic liquid crystallinity at 20° C., in a case where the composition contains the salt, $ny^{P1}$ represents a refractive index in an in-plane fast axis direction of the optically anisotropic film P1, and $nz^{P1}$ represents a refractive index in a thickness direction of the optically anisotropic film P1, and wherein the $Nz^{P1}$ is −0.25 to −0.19.

11. An optically anisotropic film formed of a lyotropic liquid crystalline composition containing a non-colorable rod-like compound and a non-colorable plate-like compound, wherein, in a case where a measurement to obtain an ultraviolet-visible absorption spectrum by applying linearly polarized light from a normal direction of the optically anisotropic film is carried out by changing a direction of the linearly polarized light and assuming that a direction in which an absorbance at a maximum absorption wavelength in a wavelength range of 230 to 400 nm of the rod-like compound is the highest is defined as a first direction, and a direction in which an absorbance at a maximum absorption wavelength in a wavelength range of 230 to 400 nm of the plate-like compound is the highest is defined as a second direction, the first direction and the second direction are orthogonal to each other, the maximum absorption wavelength in the wavelength range of 230 to 400 nm of the rod-like compound is smaller than the maximum absorption wavelength in the wavelength range of 230 to 400 nm of the plate-like compound, $Nz^P$ represented by Expression (N) of the plate-like compound is negative, $$Nz^P = (nx^P - nz^P)/(nx^P - ny^P) \quad \text{Expression (N)}$$

$nx^P$ represents a refractive index in an in-plane slow axis direction of an optically anisotropic film P, which is formed by using a mixed solution P1 obtained by mixing 10 parts by mass of the non-colorable plate-like compound and 90 parts by mass of water, in a case where the composition does not contain a salt, or is formed by using a mixed solution P2 obtained by mixing 10 parts by mass of the non-colorable plate-like compound, 90 parts by mass of water, and an amount of the salt having the same content ratio as a content ratio of the salt to the plate-like compound in the composition, in a case where the composition contains the salt, $ny^P$ represents a refractive index in an in-plane fast axis direction of the optically anisotropic film P, and $nz^P$ represents a refractive index in a thickness direction of the optically anisotropic film P, and wherein the rod-like compound is a polymer having a repeating unit represented by Formula (X), $$-\!\!\!+\!\!R^{x1}\!-\!L^{x1}\!-\!R^{x2}\!-\!L^{x2}\!\!\!+\!\!- \quad (X)$$

$R^{x1}$ represents a divalent aromatic ring group having a substituent containing a hydrophilic group, a divalent non-aromatic ring group having a substituent containing a hydrophilic group, or a group represented by Formula (X1),

$*\!-\!R^{x3}\!-\!L^{x3}\!-\!R^{x4}\!-\!* \quad$ Formula (X1)

in Formula (X1), * represents a bonding position, $R^{x3}$ and $R^{x4}$ each independently represent a divalent aromatic ring group which may have a substituent containing a hydrophilic group, or a divalent non-aromatic ring group which may have a substituent containing a hydrophilic group, and at least one of $R^{x3}$ or $R^{x4}$ represents a divalent aromatic ring group which has a substituent containing a hydrophilic group, or a divalent non-aromatic ring group which has a substituent containing a hydrophilic group, $L^{x3}$ represents a single bond, —O—, —S—, an alkylene group, an alkenylene group, or an alkynylene group, $R^{x2}$ represents a divalent non-aromatic ring group or a group represented by Formula (X2), $$*\!-\!Z^{x1}\!-\!Z^{x2}\!-\!* \quad \text{Formula (X2)}$$

$Z^{x1}$ and $Z^{x2}$ each independently represent a divalent non-aromatic ring group, $L^{x1}$ and $L^{x2}$ each independently represent —CONH—, —COO—, —O—, or —S—, in Formula (X1), * represents a bonding position, and in Formula (X2), * represents a bonding position.

12. An optically anisotropic film formed of a lyotropic liquid crystalline composition containing a non-colorable rod-like compound and a non-colorable plate-like compound, wherein, in a case where a measurement to obtain an ultraviolet-visible absorption spectrum by applying linearly polarized light from a normal direction of the optically anisotropic film is carried out by changing a direction of the linearly polarized light and assuming that a direction in which an absorbance at a maximum absorption wavelength in a wavelength range of 230 to 400 nm of the rod-like compound is the highest is defined as a first direction, and a direction in which an absorbance at a maximum absorption wavelength in a wavelength range of 230 to 400 nm of the plate-like compound is the highest is defined as a second direction, the first direction and the second direction are orthogonal to each other, the maximum absorption wavelength in the wavelength range of 230 to 400 nm of the rod-like compound is smaller than the maximum absorption wavelength in the wavelength range of 230 to 400 nm of the plate-like compound, $Nz^{P1}$ represented by Expression (N1) of the plate-like compound is negative, $$Nz^{P1} = (nx^{P1} - nz^{P1})/(nx^{P1} - ny^{P1}) \quad \text{Expression (N1)}$$

$nx^{P1}$ represents a refractive index in an in-plane slow axis direction of an optically anisotropic film P1, which is formed by using a mixed solution P3 obtained by mixing the non-colorable plate-like compound and water and exhibiting lyotropic liquid crystallinity at 20° C., in a case where the composition does not contain a salt, or is formed by using a mixed solution P4 obtained by mixing the non-colorable plate-like compound, water, and an amount of the salt having the same content ratio as a content ratio of the salt to the plate-like compound in the composition and exhibiting lyotropic liquid crystallinity at 20° C., in a case where the composition contains the salt, $ny^{P1}$ represents a refractive index in an in-plane fast axis direction of the optically anisotropic film P1, and $nz^{P1}$ represents a refractive index in a thickness direction of the optically anisotropic film P1, and wherein the rod-like compound is a polymer having a repeating unit represented by Formula (X),

 (X)

$R^{x1}$ represents a divalent aromatic ring group having a substituent containing a hydrophilic group, a divalent non-aromatic ring group having a substituent containing a hydrophilic group, or a group represented by Formula (X1),

 Formula (X1)

in Formula (X1), * represents a bonding position,
$R^{x3}$ and $R^{x4}$ each independently represent a divalent aromatic ring group which may have a substituent containing a hydrophilic group, or a divalent non-aromatic ring group which may have a substituent containing a hydrophilic group, and at least one of $R^{x3}$ or $R^{x4}$ represents a divalent aromatic ring group which has a substituent containing a hydrophilic group, or a divalent non-aromatic ring group which has a substituent containing a hydrophilic group, $L^{x3}$ represents a single bond, —O—, —S—, an alkylene group, an alkenylene group, or an alkynylene group, $R^{x2}$ represents a divalent non-aromatic ring group or a group represented by Formula (X2),

*—$Z^{x1}$—$Z^{x2}$—*  Formula (X2)

$Z^{x1}$ and $Z^{x2}$ each independently represent a divalent non-aromatic ring group, $L^{x1}$ and $L^{x2}$ each independently represent —CONH—, —COO—, —O—, or —S—, in Formula (X1), * represents a bonding position, and
in Formula (X2), * represents a bonding position.

* * * * *